(12) United States Patent
Miyawaki

(10) Patent No.: US 10,593,913 B2
(45) Date of Patent: Mar. 17, 2020

(54) ENERGY STORAGE APPARATUS FOR SUPPRESSING ADVERSE EFFECTS EXERTED ON CIRCUIT BOARDS

(71) Applicant: GS Yuasa International Ltd., Kyoto (JP)

(72) Inventor: Yasutaka Miyawaki, Kyoto (JP)

(73) Assignee: GS Yuasa International Ltd., Kyoto-shi, Kyoto (JP)

( * ) Notice: Subject to any disclaimer, the term of this patent is extended or adjusted under 35 U.S.C. 154(b) by 0 days.

(21) Appl. No.: 15/738,078

(22) PCT Filed: Jun. 10, 2016

(86) PCT No.: PCT/JP2016/067344
§ 371 (c)(1),
(2) Date: Dec. 19, 2017

(87) PCT Pub. No.: WO2017/002584
PCT Pub. Date: Jan. 5, 2017

(65) Prior Publication Data
US 2018/0315967 A1 Nov. 1, 2018

(30) Foreign Application Priority Data

Jun. 30, 2015 (JP) ................................ 2015-132232
Jun. 30, 2015 (JP) ................................ 2015-132238
Jun. 30, 2015 (JP) ................................ 2015-132241

(51) Int. Cl.
*H01M 2/10* (2006.01)
*H01G 11/82* (2013.01)
(Continued)

(52) U.S. Cl.
CPC .......... *H01M 2/1016* (2013.01); *H01G 11/10* (2013.01); *H01G 11/74* (2013.01);
(Continued)

(58) Field of Classification Search
CPC .......... H01M 2/1016; H01M 10/4257; H01M 2/202; H01M 10/0525; H01M 2220/10;
(Continued)

(56) References Cited

U.S. PATENT DOCUMENTS 3,268,772 A 8/1966 Kamei et al.
2003/0194603 A1 10/2003 Kim
(Continued)

FOREIGN PATENT DOCUMENTS

JP H06262986 A 9/1994
JP H08329913 A 12/1996
(Continued)

OTHER PUBLICATIONS

Extended European Search Report, dated Jan. 21, 2019, for European Patent Application No. 16817693.1, 6 pages, European Patent Office, Europe.

(Continued)

*Primary Examiner* — Gary D Harris
(74) *Attorney, Agent, or Firm* — Alston & Bird LLP

(57) ABSTRACT

An electricity storage device (1) which is provided with an electricity storage element (40) and an outer case (10). This electricity storage device (1) is also provided with: a measurement substrate (81) which is connected to the electricity storage element (40), and through which a first electric current passes; and a main circuit substrate (82) through which a second electric current that is larger than the first electric current passes. The main circuit substrate (82) is arranged so as to face a part of a container (410) of the electricity storage element (40), said part being different from a long lateral surface (411) of the container (410).

19 Claims, 21 Drawing Sheets

(51) Int. Cl.
  *H01G 11/74*   (2013.01)
  *H01G 11/10*   (2013.01)
  *H01M 2/20*   (2006.01)
  *H01M 10/42*   (2006.01)
  *H01M 10/0525*   (2010.01)

(52) U.S. Cl.
  CPC ............ *H01G 11/82* (2013.01); *H01M 2/202* (2013.01); *H01M 10/4257* (2013.01); *H01M 10/0525* (2013.01); *H01M 2220/10* (2013.01); *Y02E 60/13* (2013.01)

(58) Field of Classification Search
  CPC ........ H01G 11/74; H01G 11/10; H01G 11/82; Y02E 60/13
  USPC ............................................................ 429/7
  See application file for complete search history.

(56) References Cited

U.S. PATENT DOCUMENTS

| 2004/0047132 | A1* | 3/2004 | Ikari ................... H04N 5/2252 361/714 |
|---|---|---|---|
| 2006/0177733 | A1 | 8/2006 | Ha et al. |
| 2011/0076521 | A1 | 3/2011 | Shimizu et al. |
| 2011/0101920 | A1 | 5/2011 | Seo et al. |
| 2012/0019061 | A1 | 1/2012 | Nishihara et al. |
| 2012/0100399 | A1 | 4/2012 | Adachi et al. |
| 2012/0308848 | A1 | 12/2012 | Miyamae et al. |
| 2013/0252074 | A1 | 9/2013 | Hsiao et al. |
| 2013/0302651 | A1 | 11/2013 | Kim et al. |
| 2015/0111073 | A1 | 4/2015 | Deriha et al. |

FOREIGN PATENT DOCUMENTS

| JP | 3190872 | B2 | 7/2001 |
|---|---|---|---|
| JP | 2013-197090 | A | 9/2001 |
| JP | 2003-331800 | A | 11/2003 |
| JP | 2008-521199 | A | 6/2008 |
| JP | 2010-146774 | A | 7/2010 |
| JP | 2012-028186 | A | 2/2012 |
| JP | 2012-094330 | A | 5/2012 |
| JP | 2012-128984 | A | 7/2012 |
| JP | 2012-253838 | A | 12/2012 |
| JP | 2013-073918 | A | 4/2013 |
| JP | 2013-235828 | A | 11/2013 |
| JP | 2014-013724 | A | 1/2014 |
| JP | 2014-029790 | A | 2/2014 |
| JP | 5481309 | B2 | 4/2014 |
| JP | 2014-107241 | A | 6/2014 |
| JP | 2014-132585 | A | 7/2014 |
| JP | 5537111 | B2 | 7/2014 |
| JP | 5621765 | B2 | 11/2014 |
| JP | 2015-026486 | A | 2/2015 |
| JP | 2015-050063 | A | 3/2015 |
| JP | 2015-082398 | A | 4/2015 |
| WO | WO-2011/093327 | A1 | 8/2011 |
| WO | WO 2014/068881 | A1 | 5/2014 |
| WO | WO-2015/001699 | A1 | 1/2015 |

OTHER PUBLICATIONS

International Searching Authority, International Search Report (ISR) and Written Opinion for PCT/JP2016/067344, dated Sep. 6, 2016, 10 pages, Japan Patent Office, Japan.

* cited by examiner

ENERGY STORAGE APPARATUS FOR SUPPRESSING ADVERSE EFFECTS EXERTED ON CIRCUIT BOARDS

CROSS REFERENCE TO RELATED APPLICATIONS

This application is a national stage application, filed under 35 U.S.C. § 371, of International Application No. PCT/JP2016/067344, filed Jun. 10, 2016, which claims priority to Japanese Application Nos. 2015-132232, 2015-132238 and 2015-132241, which were all filed Jun. 30, 2015, the contents of all of which as are hereby incorporated by reference in their entirety.

BACKGROUND

Technical Field

The present invention relates to an energy storage apparatus which includes an energy storage device and an outer case.

Description of Related Art

In an energy storage apparatus which includes an energy storage device, conventionally, there has been known the configuration where the energy storage apparatus includes two circuit boards (for example, JP 2003-331800 A).

BRIEF SUMMARY

However, the above-mentioned conventional energy storage apparatus has a drawback that the circuit boards are adversely affected by the energy storage devices.

The present invention has been made in view of the above-mentioned drawback, and it is an object of the present invention to provide an energy storage apparatus where an adverse effect exerted on circuit boards by an energy storage device can be suppressed.

To achieve the above-mentioned object, according to an aspect of the present invention, there is provided an energy storage apparatus which includes: an energy storage device; and an outer case; a first circuit board which is connected to the energy storage device and through which a first current flows; and a second circuit board through which a second current larger than the first current flows. The second circuit board is disposed such that the second circuit board opposedly faces a position which differs from a long side surface of a container of the energy storage device.

According to the present invention, it is possible to provide an energy storage apparatus where an adverse effect exerted on the circuit boards by the energy storage device can be suppressed.

DETAILED DESCRIPTION OF VARIOUS EMBODIMENTS

Figure 1:
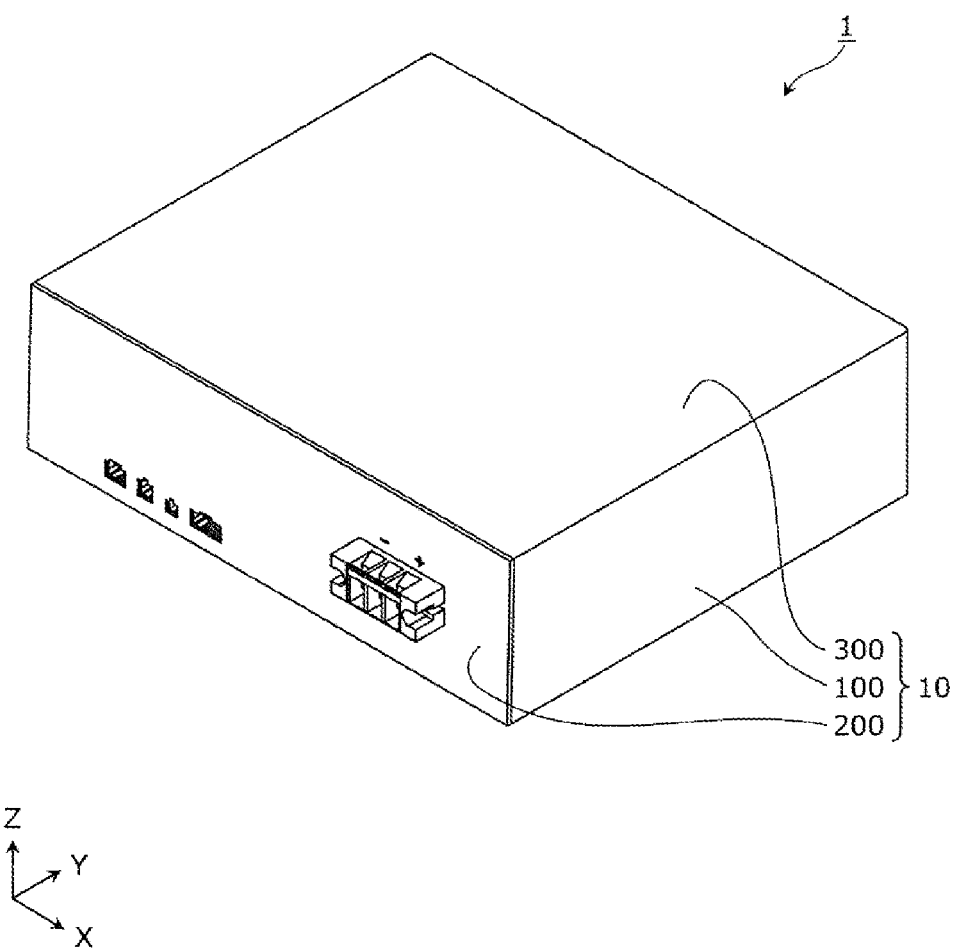
FIG. 1 is a perspective view showing an external appearance of an energy storage apparatus according to an embodiment of the present invention.

The above-mentioned energy storage apparatus has a drawback that the circuit board is adversely affected by the energy storage device. That is, the energy storage device which the energy storage apparatus includes generates heat. Since the above-mentioned conventional energy storage apparatus has two circuit boards, unless these two circuit boards are properly disposed, there is a concern that heat from the energy storage device adversely affects the circuit board.

The present invention has been made to overcome the above-mentioned drawbacks, and it is an object of the present invention to provide an energy storage apparatus where an adverse effect exerted on a circuit board by an energy storage device can be suppressed.

To achieve the above-mentioned object, according to an aspect of the present invention, there is provided an energy storage apparatus which includes: an energy storage device; and an outer case; a first circuit board which is connected to the energy storage device and through which a first current flows; and a second circuit board through which a second current larger than the first current flows. The second circuit board is disposed such that the second circuit board opposedly faces a position which differs from a long side surface of a container of the energy storage device.

With such a configuration, the energy storage apparatus includes the first circuit board and the second circuit board, and the second circuit board through which a current larger than a current flowing in the first circuit board flows is disposed such that the second circuit board opposedly faces the position which differs from the long side surface of the container of the energy storage device. That is, since the energy storage device generates large heat from the long side surface of the container in general, the second circuit board in which heat is liable to be generated due to the flow of a large current through the second circuit board is disposed on a side different from the long side surface thus suppressing the further generation of heat in the second circuit board attributed to heat from the energy storage device. In this manner, by arranging the circuit boards by taking into account a magnitude of an adverse effect which the heat from the energy storage device exerts, it is possible to suppress an adverse effect on the circuit boards by the energy storage device.

The first circuit board may be disposed such that the first circuit board opposedly faces the long side surface of the container of the energy storage device.

With such a configuration, in the energy storage apparatus, the first circuit board is disposed such that the first circuit board opposedly faces the long side surface of the container of the energy storage device. That is, the first circuit board in which heat is minimally generated due to the flow of a small current through the first circuit board is disposed on the long side surface side which generates a large heat. In this manner, by arranging the circuit boards by taking into account a magnitude of an adverse effect which the heat from the energy storage device exerts, it is possible to suppress an adverse effect on the circuit boards by the energy storage device.

The second circuit board may be disposed such that the second circuit board opposedly faces a short side surface of the container of the energy storage device.

With such a configuration, in the energy storage apparatus, the second circuit board is disposed such that the second circuit board opposedly faces the short side surface of the container of the energy storage device. That is, the first circuit board is disposed on the long side surface side of the container of the energy storage device, and the second circuit board is disposed on the short side surface side of the container of the energy storage device. Accordingly, two circuit boards can be disposed by making use of a dead space on the long surface side of the container of the energy storage device and a dead space on the short surface side of the container of the energy storage device and hence, it is possible to realize the downsizing of the energy storage apparatus.

The first circuit board may be disposed along an inner surface of the first wall of the outer case, and the second circuit board may be disposed along an inner surface of the second wall disposed adjacently to the first wall of the outer case.

With such a configuration, two circuit boards are disposed along the inner surfaces of two walls disposed adjacently to each other. Accordingly, two circuit boards can be disposed by making use of a vacant space formed by displacing the energy storage device to the corner in the outer case. Accordingly, downsizing of the energy storage apparatus can be realized. Further, a distance between two circuit boards can be shortened and hence, two circuit boards can be connected easily at a low cost by directly connecting two circuit boards using a circuit-board to circuit-board connector or the like.

At least one of the first circuit board and the second circuit board may be fixed to the inner wall surface of the outer case.

With such a configuration, at least one of the first two circuit boards is fixed to the inner wall surface of the outer case and hence, such a circuit board is disposed away from the energy storage device. Accordingly, it is possible to suppress the occurrence of a phenomenon that heat from the energy storage device is transmitted to the circuit board and adversely affects the circuit board. Further, it is possible to suppress the occurrence of a phenomenon that noise occurs in a circuit disposed in the inside of the circuit board due to an electric current which flows from the energy storage device. In this manner, according to the energy storage apparatus of the present invention, an adverse effect exerted on the circuit board by the energy storage device can be suppressed.

The outer case may include, on an inner surface of a bottom wall thereof, a first restricting portion which restricts a movement of at least one of the first circuit board and the second circuit board in a direction along the bottom wall.

With such a configuration, in the energy storage apparatus, the first restricting portion formed on the inner surface of the bottom wall of the outer case restricts the movement of at least one of two circuit boards in the direction along the bottom wall. That is, the circuit board can be positioned at an end portion of the circuit board on a bottom wall side and hence, the circuit board can be easily fixed to the outer case.

Further, in an energy storage apparatus including an energy storage device, conventionally, there has been known a configuration where a circuit board is accommodated in the inside of an outer case (see, for example, patent document 2 (JP-A-2012-253838). In such an energy storage apparatus, in the inside of the outer case, the circuit board is mounted on a side surface of a support frame for an energy storage device.

However, the above-mentioned energy storage apparatus has a drawback that there is a concern that the circuit board is adversely affected by the energy storage device. That is, in the above-mentioned energy storage apparatus, the circuit board is directly or indirectly brought into contact with the energy storage device and hence, there is a concern that heat from the energy storage device is transmitted to the circuit board and adversely affects the circuit board. Further, there is also a concern that noise occurs in a circuit in the inside of the circuit board due to an electric current which flows from the energy storage device.

According to an aspect of the present invention, there is provided an energy storage apparatus which includes: an energy storage device; and an outer case, wherein the energy storage apparatus includes the circuit board (at least one circuit board out of the first circuit board and the second circuit board) which is disposed in the inside of the outer case and is connected to the energy storage device, and the circuit board is fixed to an inner wall surface of the outer case.

With such a configuration, in the energy storage apparatus, the circuit board (at least one circuit board out of the first circuit board and the second circuit board) is fixed to the inner wall surface of the outer case and hence, the circuit board is disposed away from the energy storage device. Accordingly, it is possible to suppress the occurrence of a phenomenon that heat from the energy storage device is transmitted to the circuit board and adversely affects the circuit board. Further, it is possible to suppress the occurrence of a phenomenon that noise occurs in a circuit disposed in the inside of the circuit board due to an electric current which flows from the energy storage device. In this manner, according to the energy storage apparatus of the present invention, an adverse effect exerted on the circuit board by the energy storage device can be suppressed.

The above-mentioned circuit board (at least one circuit board out of the first circuit board and the second circuit board) may be fixed to an inner surface of a side wall of the outer case.

In the case of mounting the circuit board on an upper surface or a bottom surface of the outer case, it is necessary to ensure a space in which the circuit board is disposed in a height direction. On the other hand, in case of mounting the circuit board on the side surface of the outer case, the circuit board can be disposed by making use of a dead space on a side of the energy storage device. Accordingly, in the energy storage apparatus, the circuit board is fixed to the inner surface of the side wall of the outer case and hence, it is possible to realize downsizing of the energy storage apparatus by making use of a dead space on a side of the energy storage device.

The above-mentioned circuit board (at least one circuit board out of the first circuit board and the second circuit board) may be disposed parallel to the inner surface of the side wall of the outer case.

With such a configuration, by arranging the circuit board parallel to the inner surface of the side wall of the outer case, the circuit board is directed in a vertical direction. Accordingly, for example, even in the case where the energy storage apparatus is used in a site such as a desert where dust is large, it is possible to suppress piling of the dust on the circuit board.

The outer case may include a fixing portion for fixing an end portion of the above-mentioned circuit board (at least one circuit board out of the first circuit board and the second circuit board) on an inner surface of the side wall.

With such a configuration, in the energy storage apparatus, the end portion of the circuit board is fixed by the fixing portion formed on the inner surface of the side wall of the outer case. Accordingly, the circuit board can be fixed with certainty to the side wall without obstructing the arrangement of electronic parts in the inside of the circuit board.

The outer case may include, on an inner surface of a bottom wall thereof, a first restricting portion which restricts the movement of the above-mentioned circuit board (at least one circuit board out of the first circuit board and the second circuit board) in a direction along the bottom wall.

With such a configuration, in the energy storage apparatus, the first restricting portion formed on the inner surface of the bottom wall of the outer case restricts the movement of the circuit board in a direction along the bottom wall. That is, the circuit board can be positioned by an end portion of the circuit board on a bottom wall side and hence, the circuit board can be easily fixed to the outer case.

The first restricting portion may include a recessed portion into which the above-mentioned circuit board (at least one circuit board out of the first circuit board and the second circuit board) is detachably inserted in a direction toward the bottom wall.

With such a configuration, the recessed portion is formed on the first restricting portion, and the circuit board is detachably inserted into the recessed portion. Accordingly, the first restricting portion can be formed in a simple shape in the form of a recessed portion and hence, the first restricting portion can be formed easily. Further, mounting of the circuit board can be easily performed by merely inserting the circuit board into the recessed portion, and removal of the circuit board can be also easily performed.

The energy storage apparatus may include: a first circuit board through which a first current flows and which is disposed such that the first circuit board opposedly faces a long side surface of a container of the energy storage device; and a second circuit board through which a second current larger than the first current flows and which is disposed such that the second circuit board opposedly faces a position which differs from the long side surface of the container of the energy storage device, and at least one of the first circuit board and the second circuit board may be fixed to an inner wall surface of the outer case as the circuit board.

With such a configuration, the energy storage apparatus includes: the first circuit board which is disposed such that the first circuit board opposedly faces the long side surface of the container of the energy storage device; and the second circuit board through which a current larger than a current flowing in the first circuit board flows and which is disposed such that the second circuit board opposedly faces a position which differs from the long side surface of the container of the energy storage device. Further, at least one of the first circuit board and the second circuit board is fixed to an inner wall surface of the outer case. That is, since the energy storage device generates large heat from the long side surface side of the container in general, the first circuit board in which heat is minimally generated due to the flow of a small current through the first circuit board is disposed on the long side surface side, and the second circuit board in which heat is liable to be generated due to the flow of a large current through the second circuit board is disposed on a side different from the long side surface thus preventing the further generation of heat in the second circuit board attributed to heat from the energy storage device. In this manner, by disposing the circuit boards by taking into account a magnitude of an adverse effect which the heat from the energy storage device exerts, it is possible to suppress an adverse effect on the circuit boards by the energy storage device.

The energy storage apparatus may further include a circuit-board to circuit-board connector which connects the first circuit board and the second circuit board to each other, and the first circuit board and the second circuit board may be fixed to the inner surfaces of two side walls of the outer case disposed adjacently to each other respectively.

With such a configuration, two circuit boards which are connected to each other by the circuit-board to circuit-board connector are fixed to the inner surfaces of two side walls of the outer case disposed adjacently to each other respectively. That is, the two circuit boards which are formed in an L shape can be disposed in an L-shaped dead space formed in the inside of the energy storage apparatus. Accordingly, downsizing of the energy storage apparatus can be realized by effectively making use of the dead space in the inside of the energy storage apparatus.

In an energy storage apparatus having an energy storage device, conventionally, there has been known the configuration where the energy storage device is accommodated in the inside of an outer case (for example, see patent document 3, JP-A-2013-73918).

In the conventional energy storage apparatus, there exists a relationship where a size of the outer case and a size of the energy storage device correspond to each other. Accordingly, in assembling the energy storage apparatus, it is difficult to perform an operation of disposing parts other than the energy storage device in the inside of the outer case thus giving rise to a concern that operability in assembling the energy storage apparatus is lowered.

According to an aspect of the present invention, there is provided an energy storage apparatus which includes: an energy storage device; and an outer case, wherein the energy storage apparatus includes a holding member which holds the energy storage device, the outer case includes a second restricting portion which restricts the movement of the holding member in a direction along a wall surface of the outer case on the wall surface of the outer case, the holding member is smaller than the outer case and is disposed in an offset manner with respect to the outer case, and an L-shaped space is formed between the holding member and the outer case.

With such a configuration, in the energy storage apparatus, the holding member is smaller than the outer case and the holding member is disposed in an offset manner with respect to the outer case. Accordingly, the L-shaped space is formed between the holding member and the outer case. In this manner, the space can be formed between at least two surfaces of the inner surfaces of the holding member and the outer case and hence, the space between the holding member and the outer case can be increased. Accordingly, parts other than the energy storage device can be easily disposed in the outer case thus enhancing operability in assembling the energy storage apparatus.

The above-mentioned second restricting portion may restrict the movement of the holding member by engaging with a portion of the holding member.

With such a configuration, the second restricting portion restricts the movement of the holding member by engaging with the portion of the holding member. Accordingly, the movement of the holding member in a direction along the wall surface can be easily restricted with the simple configuration.

The second restricting portion may be a convex portion projecting from the above-mentioned wall surface.

With such a configuration, the convex portion formed in a projecting manner from a wall surface of the outer case engages with the holding member and hence, the movement of the holding member is restricted. Accordingly, the movement of the holding member in a direction along the wall surface can be easily restricted with the simple configuration.

The above-mentioned holding member may have an opening portion into which the convex portion is fitted.

With such a configuration, the convex portion formed on the wall surface of the outer case is fitted into the opening portion of the holding member. Accordingly, the movement of the holding member in a direction along the wall surface of the outer case can be easily restricted with the simple configuration.

The energy storage apparatus may include a fixing member which is connected to the convex portion and fixes the holding member.

With such a configuration, the holding member can be fixed by connecting the fixing member to the convex portion from the inside of the energy storage apparatus and hence, it is unnecessary to fix the holding member to the outer case from the outside of the outer case by using the fixing member. Accordingly, it is possible to enhance the operability in assembling the energy storage apparatus.

Hereinafter, an energy storage apparatus according to an embodiment of the present invention is described with reference to drawings. The embodiment described hereinafter relates to one specific example of the present invention. However, numerical values, shapes, materials, constitutional elements, arrangement positions and connections modes of the constitutional elements and the like described in the embodiment hereinafter are only examples and are not intended to be used for limiting the present invention. Among the constitutional elements in the embodiments described hereinafter, the constitutional elements which are not described in independent claims which describe uppermost concepts are described as arbitrary constitutional elements. The respective views in the attached drawings are views for describing the energy storage apparatus and are not necessarily strictly described in an actual scale.

First, a configuration of an energy storage apparatus 1 is described.

Figure 2:
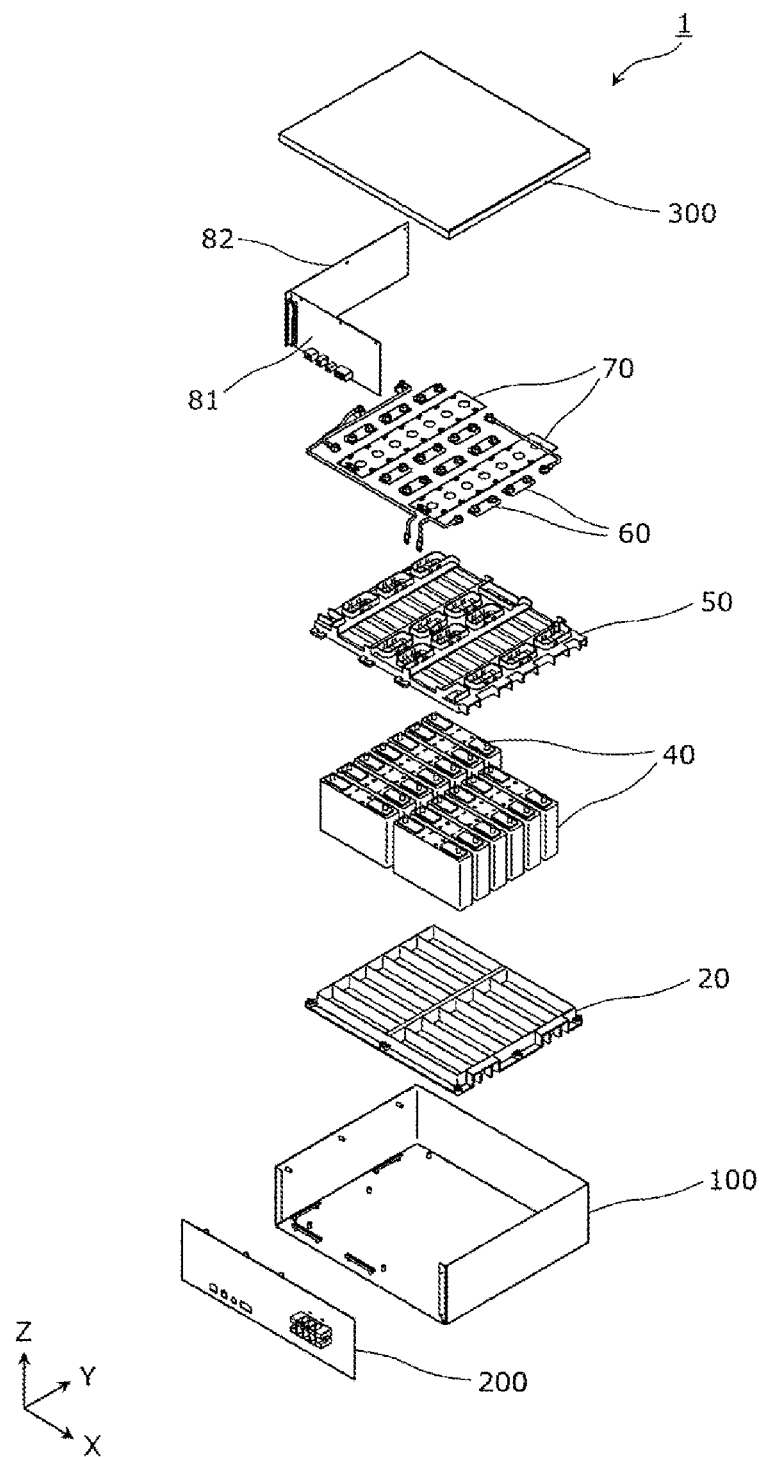
FIG. 2 is an exploded perspective view showing constitutional elements of the energy storage apparatus according to the embodiment of the present invention in a disassembled state.

FIG. 1 is a perspective view showing an external appearance of the energy storage apparatus 1 according to an embodiment of the present invention. FIG. 2 is an exploded perspective view showing respective constitutional elements of the energy storage apparatus 1 according to the embodiment of the present invention in a disassembled state.

In these drawings, a Z axis direction is indicated as a vertical direction, and the description is made hereinafter using the Z axis direction as the vertical direction. However, there may be also a case where the Z axis direction is not the vertical direction depending on a mode of use. Accordingly, the Z axis direction is not limited to the vertical direction. For example, an X axis direction may be the vertical direction. The same goes for drawings which are referenced hereinafter.

The energy storage apparatus 1 is an apparatus which can charge electricity from the outside of the energy storage apparatus 1 therein or can discharge electricity to the outside of the energy storage apparatus 1. For example, the energy storage apparatus 1 is a battery module used for power storage application, power source application or the like. Especially, the energy storage apparatus 1 according to this embodiment is preferably used as a stationary-type power source device.

As shown in FIG. 1, the energy storage apparatus 1 includes an outer case 10 which is constituted of an outer case body 100, a front wall portion 200, and an upper wall portion 300. As shown in FIG. 2, the energy storage apparatus 1 includes, in the inside of the outer case 10, a bottom-surface-side arrangement member 20, energy storage devices 40, a terminal-side arrangement member 50, bus bars 60, wiring circuit boards 70, a measuring circuit board 81, and a main circuit board 82.

The outer case 10 is a container (module case) having a rectangular shape (box shape) which forms an outer case of the energy storage apparatus 1. The energy storage devices 40, the circuit boards (the wiring circuit boards 70, the measuring circuit board 81, the main circuit board 82) and the like are arranged at predetermined positions in the outer case 10 in such a manner that the outer case 10 protects the energy storage devices 40, the circuit boards and the like from an impact or the like. The outer case 10 is made of a material having high rigidity such as metal, for example, aluminum, iron or the like. The outer case 10 may be made of a resin material such as polypropylene (PP), polycarbonate (PC), polybutylene terephthalate (PBT) or an acrylonitrile butadiene styrene (ABS) resin. However, from a viewpoint of ensuring heat radiation property and strength, it is preferable that the outer case 10 be made of metal or the like.

The outer case 10 includes the outer case body 100, the front wall portion 200, and the upper wall portion 300. The outer case body 100 is a member which constitutes a body of the outer case 10, and has a rectangular-shaped bottom wall and three rectangular-shaped side walls which are raised from the bottom wall. The outer case body 100 has a shape obtained by bending a plate-like member. The front wall portion 200 is a rectangular-shaped plate-like member which constitutes another side wall of the outer case 10. That is, the outer case body 100 and the front wall portion 200 form a bottomed rectangular-shaped cylindrical member. The detailed configurations of the outer case body 100 and the front wall portion 200 are described later.

The upper wall portion 300 is a member which constitutes an upper wall (lid) of the outer case 10, and is a rectangular-shaped plate-like member which closes an opening of a bottomed rectangular-shaped cylindrical member which is formed of the outer case body 100 and the front wall portion 200. That is, the opening portion is closed by the upper wall portion 300 in a state where the energy storage devices 40, the circuit boards (the wiring circuit boards 70, the measuring circuit board 81, and the main circuit board 82) and the like are disposed in the inside of the outer case body 100 and the front wall portion 200.

The bottom-surface-side arrangement member 20 is a flat rectangular-shaped member which is disposed on a bottom surface side of the energy storage devices 40, and is a member (a holding member) for supporting (holding) the energy storage devices 40 from below. That is, the bottom-surface-side arrangement member 20 is placed and mounted on a bottom wall of the outer case body 100 and is fixed to the bottom wall, and supports (holds) the energy storage devices 40 at a predetermined position with respect to the outer case 10.

To be more specific, the bottom-surface-side arrangement member 20 is made of an insulating material, and fixes the energy storage devices 40 in the inside of the outer case 10 in a state where the energy storage devices 40 are inserted in recessed portions formed on an upper surface of the bottom-surface-side arrangement member 20. In this manner, the bottom-surface-side arrangement member 20 prevents the energy storage devices 40 from being brought into contact with conductive members such as the outer case 10 and, at the same time, protects the energy storage devices 40 and the like from vibrations, an impact or the like.

Although the bottom-surface-side arrangement member 20 may be made of any insulating material, it is preferable that the bottom-surface-side arrangement member 20 be made of a resin having a high heat resistance such as glass-fiber-reinforced polybutylene terephthalate (GF reinforced PBT) or polyphenylene sulfide (PPS), for example. With such a configuration, even when the energy storage device 40 generates heat, it is possible to suppress the occurrence of a phenomenon that the bottom-surface-side arrangement member 20 is damaged so that other energy storage devices 40 are adversely affected. Provided that an insulation property of the energy storage devices 40 can be ensured, the bottom-surface-side arrangement member 20 may not be made of an insulating material.

The energy storage device 40 is a secondary battery (battery cell) which can charge electricity or discharge electricity. To be more specific, the energy storage device 40 is a nonaqueous electrolyte secondary battery such as a lithium ion secondary battery. In this embodiment, although thirteen energy storage devices 40 are accommodated in the inside of the outer case 10, by additionally disposing another one energy storage device 40 in a free space, fourteen energy storage devices 40 may be accommodated in the inside of the outer case 10. Alternatively, the number of energy storage devices 40 accommodated in the inside of the outer case 10 may be a plural number other than the above-mentioned number, or only one energy storage device 40 may be accommodated in the inside of the outer case 10. The energy storage device 40 is not limited to a nonaqueous electrolyte secondary battery, and may be a secondary battery other than the nonaqueous electrolyte secondary battery or may be a capacitor. The detailed configuration of the energy storage device 40 is described later.

The terminal-side arrangement member 50 is a flat rectangular-shaped member which is disposed on an electrode terminal side of the energy storage devices 40, and supports (holds) the energy storage devices 40 from above. That is, the terminal-side arrangement member 50 is disposed above the energy storage devices 40, and supports (holds) the energy storage devices 40 at a predetermined position with respect to the outer case 10 by sandwiching the energy storage devices 40 together with the bottom-surface-side arrangement member 20 from both sides in the vertical direction (both sides in the Z axis direction).

To be more specific, the terminal-side arrangement member 50 is made of an insulating material, and fixes the energy storage devices 40 in the inside of the outer case 10 in a state where the energy storage devices 40 are inserted in recessed portions formed on a lower surface of the terminal-side arrangement member 50. In this manner, the terminal-side arrangement member 50 prevents the energy storage devices 40 from being brought into contact with conductive members such as the outer case 10 and, at the same time, protects the energy storage devices 40 and the like from vibrations, an impact or the like.

The bus bars 60 and the wiring circuit boards 70 are placed on the terminal-side arrangement member 50. That is, the terminal-side arrangement member 50 also has a function of positioning the bus bars 60 and the wiring circuit boards 70 with respect to the energy storage devices 40 at the time of mounting the bus bars 60 and the wiring circuit boards 70 on the energy storage devices 40. Although the terminal-side arrangement member 50 may be made of any insulating material, from a viewpoint of a cost (from a viewpoint of reducing a manufacturing cost), it is preferable that the terminal-side arrangement member 50 be made of a PP, PC or an ABS resin, for example. Provided that insulation property of the energy storage devices 40, the bus bars 60 and the like can be ensured, the terminal-side arrangement member 50 may not be made of an insulating material.

The bus bars 60 are plate-like conductive members made of metal or the like which are disposed above the terminal-side arrangement member 50, and the plurality of energy storage devices 40 are electrically connected to each other via the bus bars 60. To be more specific, with respect to the energy storage devices 40 disposed adjacently to each other, each bus bar 60 connects a positive electrode terminal or a negative electrode terminal of one energy storage device 40 and a negative electrode terminal or a positive electrode terminal of the other energy storage device 40. In this embodiment, the bus bars 60 connect thirteen energy storage devices 40 in series.

The wiring circuit boards 70 are disposed above the terminal-side arrangement member 50. To detect voltages of the energy storage devices 40, the wiring circuit board 70 includes a wiring having one end thereof connected to an electrode terminal of at least one energy storage device 40 (in this embodiment the positive electrode terminals of all energy storage devices 40) out of the energy storage devices 40 which the energy storage apparatus 1 includes. Each wiring circuit board 70 has a rectangular shape, and is disposed between the positive electrodes and the negative electrodes of the energy storage devices 40. In this embodiment, although two wiring circuit boards 70 are disposed, the number of wiring circuit boards 70 is not limited. Further, although a harness or the like can be used in place of the wiring circuit board 70, by connecting the electrode terminals and the measuring circuit board 81 to each other using the wiring circuit board 70, routing of the wiring can be facilitated so that assembling property can be enhanced. The wiring circuit board 70 may be configured to detect temperatures of the energy storage devices 40 by mounting thermistors thereon.

The measuring circuit board 81 and the main circuit board 82 are circuit boards disposed between the energy storage devices 40 and the side walls of the outer case 10, and are connected to at least one energy storage device 40 out of the energy storage devices 40 which the energy storage apparatus 1 includes thus measuring and controlling a state of the energy storage device 40. To be more specific, the main circuit board 82 is a circuit board on which a main circuit part through which a large current flows is mounted, and is fixed to an inner surface of a side wall of the outer case 10 which opposedly faces a short side surface of a container of the energy storage device 40. Further, the measuring circuit board 81 is a circuit board on which a peripheral circuit part through which a small current flows is mounted, and is fixed to an inner surface of a side wall of the outer case 10 which opposedly faces a long side surface of the container of the energy storage device 40. The detailed configurations, arrangement positions and the like of the measuring circuit board 81 and the main circuit board 82 are described later.

Next, the configuration of the energy storage device 40 is described in detail.

Figure 3:
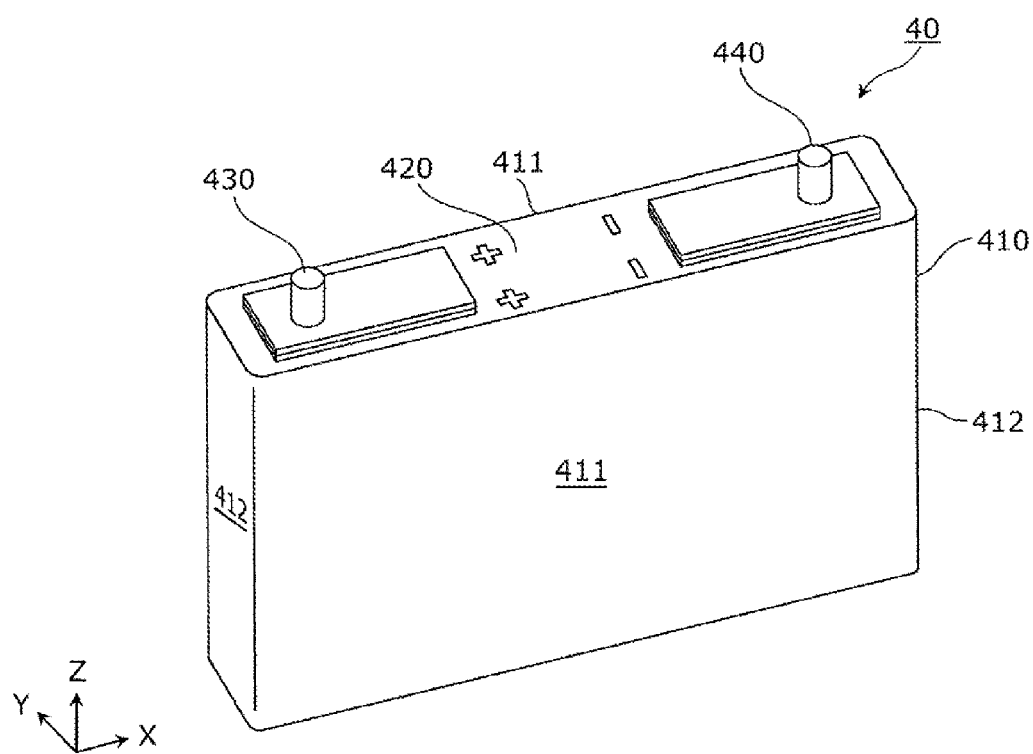
FIG. 3 is a perspective view showing the configuration of an energy storage device according to the embodiment of the present invention.

FIG. 3 is a perspective view showing the configuration of the energy storage device 40 according to the embodiment of the present invention.

As shown in FIG. 3, the energy storage device 40 includes a container 410, a positive electrode terminal 430, and a negative electrode terminal 440. The container 410 includes a container lid portion 420.

The container 410 is constituted of a metal-made rectangular-cylindrical bottomed casing body, and the metal-made container lid portion 420 which closes an opening of the casing body. The container 410 is configured such that the inside of the container 410 can be hermetically sealed by joining the container lid portion 420 and the casing body to each other by welding or the like after the electrode assembly and the like are accommodated in the inside of the container 410. The container 410 is a rectangular parallelepiped container having long side surfaces 411 on side surfaces of the container 410 on both sides in the Y axis direction in the drawing, and short side surfaces 412 on side surfaces of the container 410 on both sides in the X axis direction. Although a material for forming the container 410 is not particularly limited, it is preferable that the container 410 be made of weldable metal such as stainless steel, or aluminum, for example. Although the electrode assembly and the like are disposed in the inside of the container 410, the detailed description of the electrode assembly and the like is omitted.

Next, the configuration of the measuring circuit board 81 and the configuration of the main circuit board 82 are described in detail.

Figure 4:
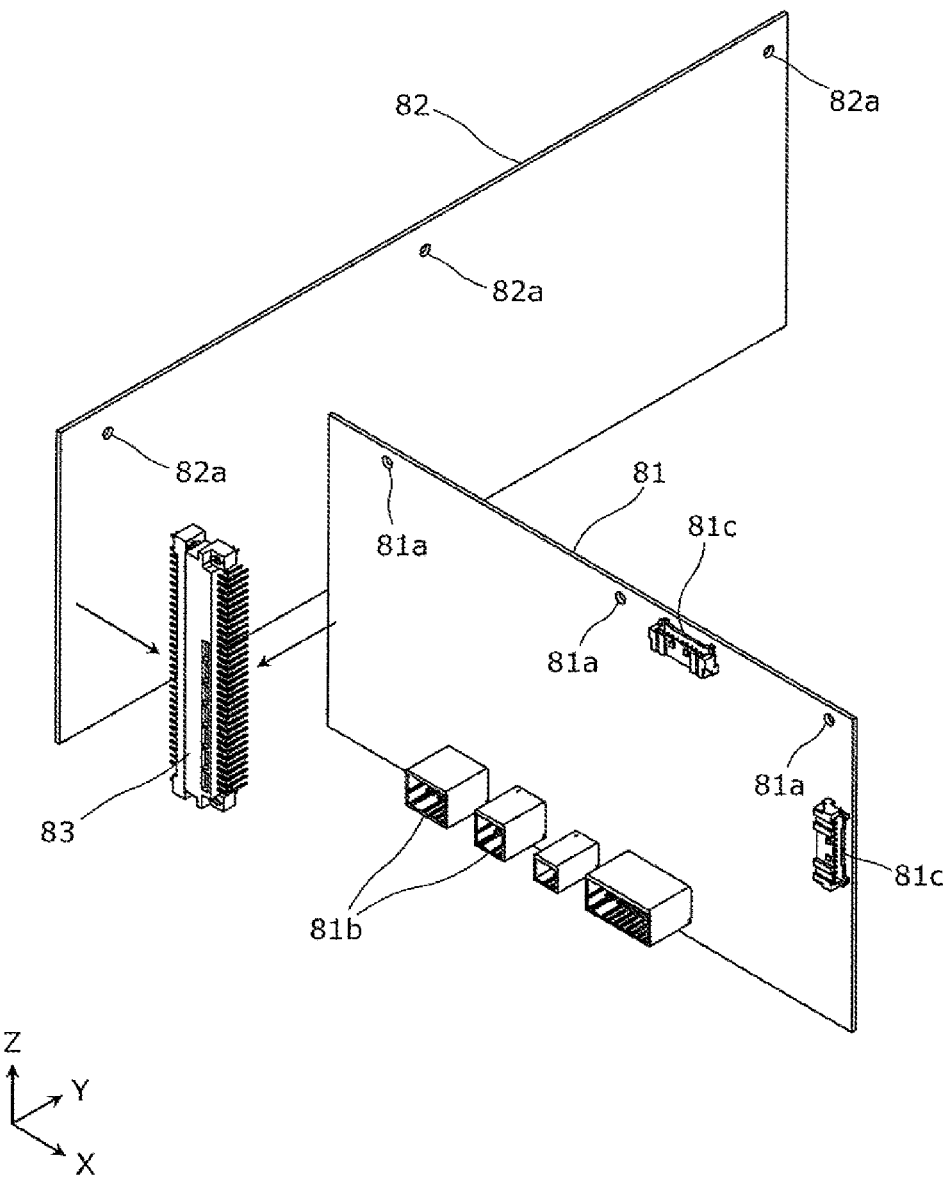
FIG. 4 is a perspective view showing the configuration of a measuring circuit board and a main circuit board according to the embodiment of the present invention.

FIG. 4 is a perspective view showing the configuration of the measuring circuit board 81 and the configuration of the main circuit board 82 according to the embodiment of the present invention.

The measuring circuit board 81 is a rectangular-shaped flat-plate-like circuit board which is connected to the energy storage devices 40 and on which a circuit which measures voltages of the energy storage devices 40 and is used for communication with the outside of the energy storage apparatus 1 is mounted. The measuring circuit board 81 is connected to the wiring circuit boards 70 so as to measure voltages of the energy storage devices 40. The measuring circuit board 81 is also connected to other energy storage apparatus 1 or an external control unit so as to perform the transmission and reception of information with the outside of the energy storage apparatus. That is, the measuring circuit board 81 is a circuit board on which a peripheral circuit part (not shown in the drawing) is mounted, and is a circuit board (first circuit board) through which a relatively small current (also referred to as a small current or a first current) flows.

The main circuit board 82 is a rectangular-shaped flat-plate-like circuit board which is connected to the energy storage devices 40 and on which a main circuit part (not shown in the drawing) through which a charging/discharging current for the energy storage device 40 flows is mounted. For example, the main circuit board 82 regulates or cuts off a supply current for charging or discharging the energy storage device 40. That is, the main circuit board 82 is a circuit board positioned on a large current path, and is a circuit board (second circuit board) through which a current larger than the above-mentioned first current (also referred to as a large current or a second current) flows.

As shown in FIG. 4, the measuring circuit board 81 is configured such that three fixing opening portions 81*a* are formed on an upper end portion of the measuring circuit board 81, and communication-use connectors 81*b* and the like are disposed on a surface of a lower portion of the measuring circuit board 81 on a minus side in the Y axis direction. Connectors 81c which are respectively connected to the wiring circuit boards 70 are disposed on an upper portion and a side portion (an end portion on a plus side in the X axis direction) of the measuring circuit board 81 respectively. In this embodiment, although the fixing opening portion 81a is a circular-shaped through hole, the fixing opening portion 81a may be a cutout, and the number of fixing opening portions 81a is not limited to three. Further, although other parts are mounted on the surface of the measuring circuit board 81 on the minus side in the Y axis direction besides the connectors 81b, 81c, the illustration and the description of these parts are omitted.

In the main circuit board 82, three fixing opening portions 82a are formed on an upper end portion. In this embodiment, the fixing opening portion 82a is a circular-shaped through hole, the fixing opening portion 82a may be a cutout, and the number of fixing opening portions 82a is not limited to three. Further, although a main circuit part such as a Central Processing Unit (CPU) is mounted on a surface of the main circuit board 82 on the plus side in the X axis direction, the illustration and the description of such a part are omitted. It is preferable to mount the main circuit part on the surface of the main circuit board 82 on the plus side in the X axis direction because the circuit board body can be disposed away from the energy storage devices 40. However, the main circuit part may be mounted on a surface of the main circuit board 82 on a minus side in the X axis direction.

The measuring circuit board 81 and the main circuit board 82 are directly connected to each other by a circuit-board to circuit-board connector 83. That is, a surface of the circuit-board to circuit-board connector 83 on a plus side in the Y axis direction and a surface of the measuring circuit board 81 on the minus side in the Y axis direction are connected to each other, and a surface of the circuit-board to circuit-board connector 83 on the minus side in the X axis direction and the surface of the main circuit board 82 on the plus side in the X axis direction are connected to each other. With such a configuration, the measuring circuit board 81 and the main circuit board 82 are connected to each other in an L shape.

As described above, the measuring circuit board 81 and the main circuit board 82 are connected to each other by the circuit-board to circuit-board connector 83. Accordingly, it is unnecessary to provide a connection harness between the circuit boards so that a manufacturing cost can be reduced. The measuring circuit board 81 and the main circuit board 82 may be connected to each other by a connection harness in place of using the circuit-board to circuit-board connector 83.

Next, the configuration of the outer case body 100 and the configuration of the front wall portion 200 are described in detail.

Figure 5:
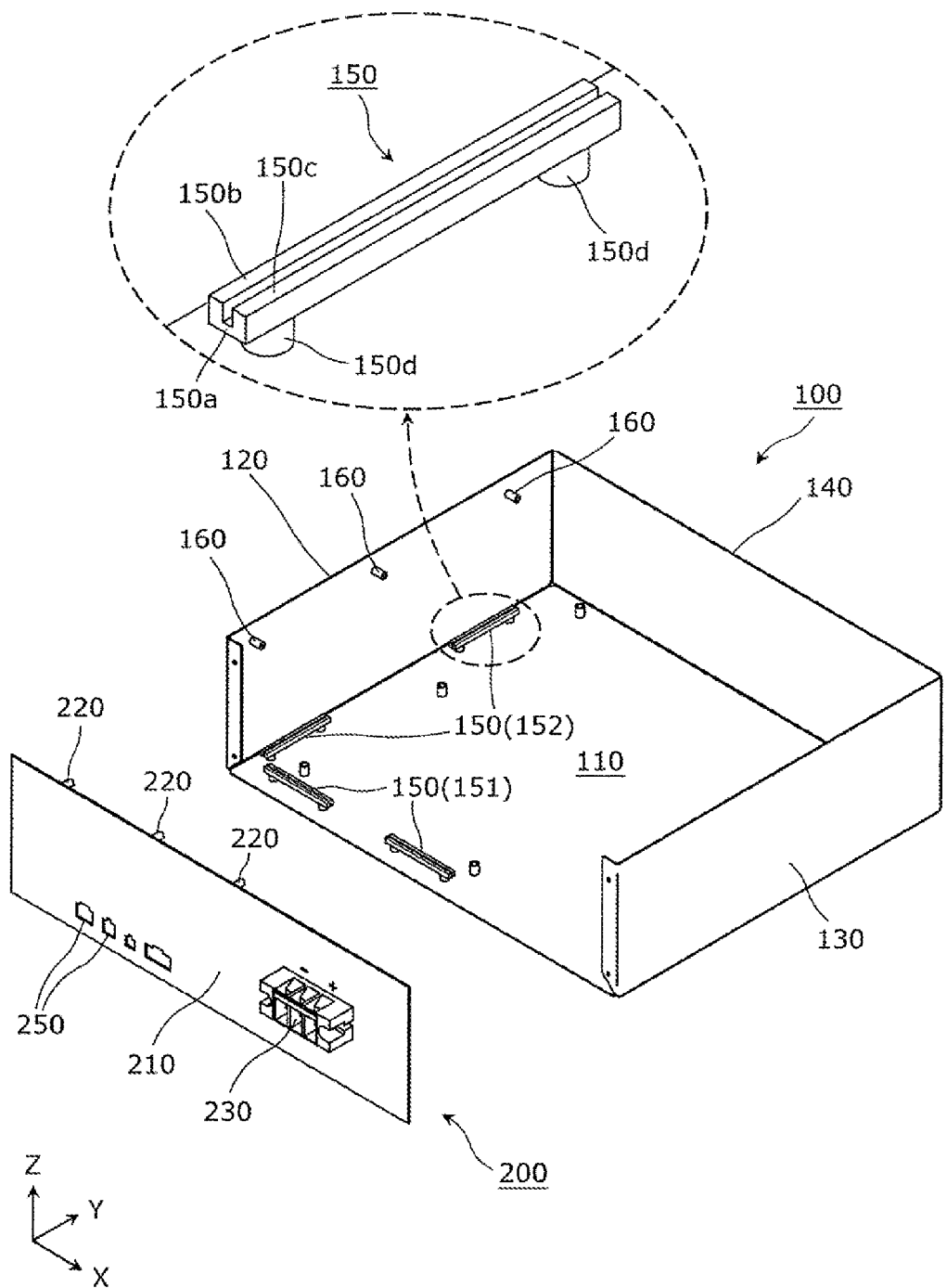
FIG. 5 is a perspective view showing the configuration of an outer case body and a front wall portion according to the embodiment of the present invention.

FIG. 5 is a perspective view showing the configuration of the outer case body 100 and the configuration of the front wall portion 200 according to the embodiment of the present invention.

As shown in FIG. 5, the outer case body 100 includes a bottom wall 110, and side walls 120 to 140. First restricting portions 150 (first restricting portions 151, 152) are mounted on an inner surface (a surface on a plus side in the Z axis direction) of the bottom wall 110, and fixing portions 160 are mounted on an inner surface (a surface on the plus side in the X axis direction) of the side wall 120. The front wall portion 200 includes a side wall 210, and fixing portions 220 are mounted on an inner surface (a surface on the plus side in the Y axis direction) of the side wall 210. An external connection terminal 230 is mounted on the side wall 210, and a plurality of connector-use opening portions 250 are formed in the side wall 210.

The bottom wall 110 is a wall (a wall in a minus side in the Z axis direction) disposed on a bottom portion of the outer case body 100, and has a rectangular flat-plate shape. The side wall 120 is a wall which is disposed on a side portion of the outer case body 100 and is raised toward an upper side (the plus side in the Z axis direction) from an end edge of the bottom wall 110 on the minus side in the X axis direction. The side wall 120 has a rectangular flat-plate shape. The side wall 130 is a wall which is disposed on a side portion of the outer case body 100, and is raised toward an upper side from an end edge of the bottom wall 110 on the plus side in the X axis direction. The side wall 130 has a rectangular flat-plate shape. The side wall 140 is a wall which is disposed on a side portion of the outer case body 100, and is raised toward an upper side from an end edge of the bottom wall 110 on the plus side in the Y axis direction. The side wall 140 has a rectangular flat-plate shape.

Each first restricting portion 150 is an elongated member which is formed along the inner surface of the bottom wall 110. In this embodiment, four first restricting portions 150 (two first restricting portions 151 and two first restricting portions 152) are provided. To be more specific, two first restricting portions 151 are elongated members extending along the inner surface of the bottom wall 110 and the inner surface of the side wall 210, and two first restricting portions 152 are elongated members extending along the inner surface of the bottom wall 110 and the inner surface of the side wall 120.

As shown in FIG. 5, each first restricting portion 150 has a base portion 150a, projecting portions 150b, 150c which project upward (toward the plus side in the Z axis direction) from the base portion 150a, and support portions 150d which support the base portion 150a. The support portion 150d is a circular columnar portion disposed below the base portion 150a. The base portion 150a extends in an elongated manner along the inner surface of the bottom wall 110 in a state where the base portion 150a is placed on two support portions 150d. The projecting portion 150b and the projecting portion 150c extend parallel to each other along an outer edge of the base portion 150a, and a recessed portion is formed between the projecting portion 150b and the projecting portion 150c. The number of the support portions 150d and a shape of the support portion 150d are not limited to the above-mentioned number and shape.

The measuring circuit board 81 or the main circuit board 82 is inserted into the recessed portion formed between the projecting portion 150b and the projecting portion 150c. That is, the recessed portion is formed in a longitudinal direction of the first restricting portion 150, and the measuring circuit board 81 or the main circuit board 82 is detachably inserted into the recessed portion toward the bottom wall 110. In this manner, the first restricting portion 150 has the recessed portion into which at least one of the measuring circuit board 81 and the main circuit board 82 is detachably inserted toward the bottom wall 110.

The fixing portions 160, 220 are portions for fixing an end portion of at least one of the measuring circuit board 81 and the main circuit board 82. That is, the fixing portions 160 are portions which are mounted on the inner surface of the side wall 120 for fixing the end portion of the main circuit board 82. To be more specific, each of the fixing portions 160 is a circular columnar portion which is disposed in a projecting manner from an upper portion of the inner surface of the side wall 120, and fixes an upper end portion of the main circuit board 82 to the side wall 120 by screwing or the like.

The fixing portions 220 mounted on the inner surface of the side wall 210 of the front wall portion 200 are portions for fixing an end portion of the measuring circuit board 81. To be more specific, each of the fixing portions 220 is a circular columnar portion disposed in a projecting manner from an upper portion of the inner surface of the side wall 210, and fixes an upper end portion of the measuring circuit board 81 to the side wall 210 by screwing or the like.

In this embodiment, two first restricting portions 151 and two first restricting portions 152 are provided. However, the number of first restricting portion 151 or first restricting portion 152 may be one, or may be three or more. The fixing portions 160 may be configured to fix not the upper end portion of the main circuit board 82 but side end portions (end portions in the Y axis direction) of the main circuit board 82. The fixing portions 220 may be configured to fix not the upper end portion of the measuring circuit board 81 but side end portions (end portions in the X axis direction) of the measuring circuit board 81. In this embodiment, three fixing portions 160 and three fixing portions 220 are provided. However, the number of fixing portions 160 or 220 may be one, or two or more, or four or more fixing portions 160 or 220 may be provided.

Further, either one of the first restricting portions 151 and the first restricting portions 152 may not be provided. That is, it is sufficient to provide the first restricting portions 150 which restrict at least one of the movement of the measuring circuit board 81 and the movement of the main circuit board 82. Similarly, either one of the fixing portions 160 or the fixing portions 220 may not be provided. That is, it is sufficient to provide fixing portions which fix at least one of the measuring circuit board 81 and the main circuit board 82 to the inner wall surface of the outer case 10.

The external connection terminal 230 is an external terminal for allowing charging of electricity from the outside to the energy storage apparatus 1 and for allowing discharging of electricity from the energy storage apparatus 1 to the outside. The external connection terminal 230 is connected to conductive members disposed outside the energy storage apparatus 1. That is, electricity is charged to the energy storage apparatus 1 from the outside through the external connection terminal 230 and electricity is discharged from the energy storage apparatus 1 to the outside through the external connection terminal 230. The external connection terminal 230 includes a positive-electrode-side external terminal and a negative-electrode-side external terminal. However, the description of the detailed configuration of the external connection terminal 230 is omitted.

The connector-use opening portions 250 are rectangular-shaped opening portions formed in a lower portion of the side wall 210, and the connectors 81b and the like disposed on the measuring circuit board 81 are inserted into the connector-use opening portions 250. That is, wirings can be connected to the measuring circuit board 81 from the outside through the connector-use opening portions 250.

A handle may be mounted on an outer surface of the side wall 210 of the front wall portion 200. With such a configuration, the removal, the movement (carrying) or the like of the energy storage apparatus 1 can be easily performed.

Figure 6:
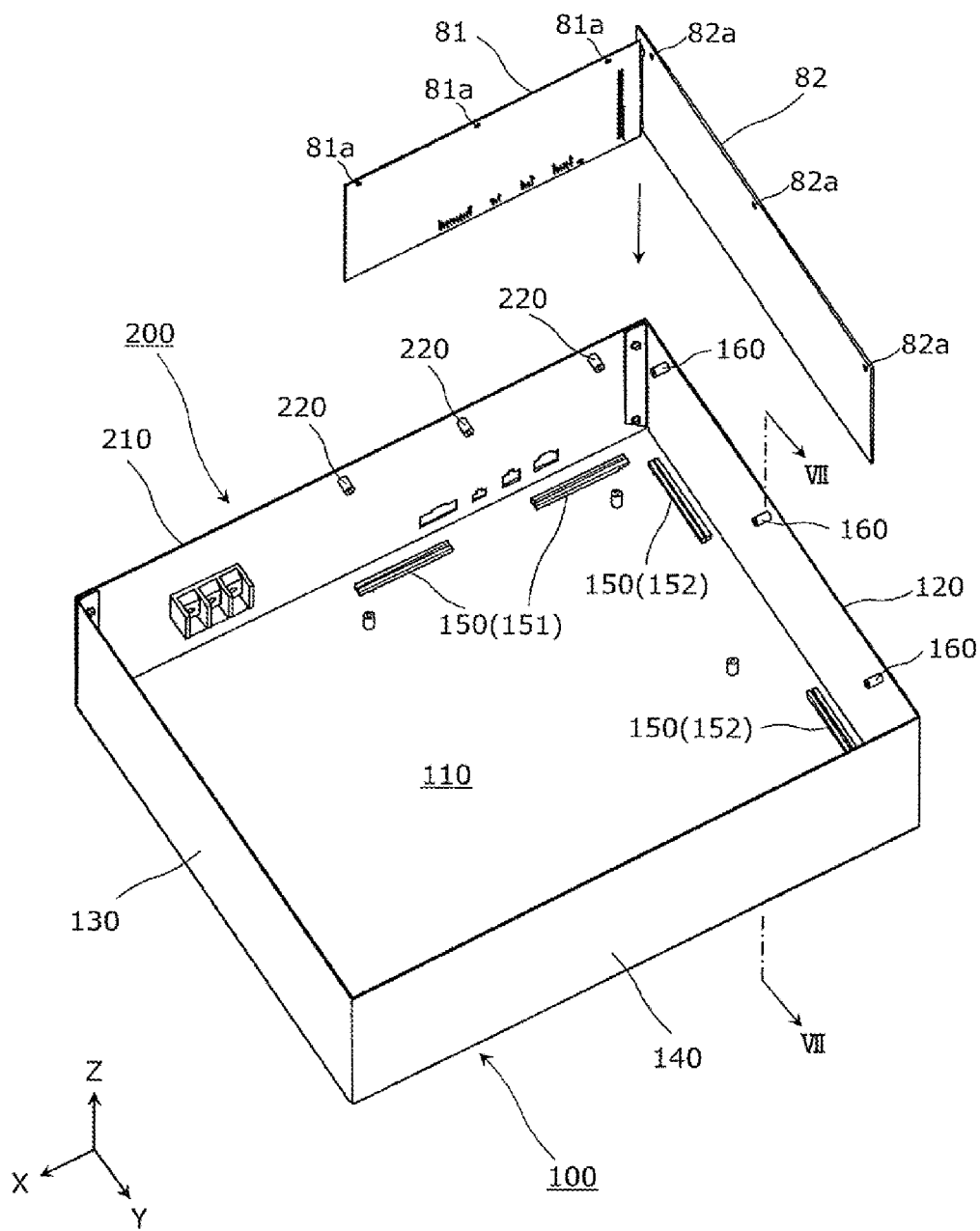
FIG. 6 is a perspective view showing the configuration where the measuring circuit board and the main circuit board are fixed to the outer case body and the front wall portion according to the embodiment of the present invention.

Next, the configuration where the measuring circuit board 81 and the main circuit board 82 are fixed to the outer case body 100 and the front wall portion 200 is described in detail. FIG. 6 is a perspective view showing the configuration where the measuring circuit board 81 and the main circuit board 82 are fixed to the outer case body 100 and the front wall portion 200 according to the embodiment of the present invention. Although the bottom-surface-side arrangement member 20, the energy storage devices 40, the terminal-side arrangement member 50 and the like are disposed in the inside of the outer case body 100 and the front wall portion 200, the illustration of these constitutional elements is omitted for the sake of convenience of the description.

Figure 7:
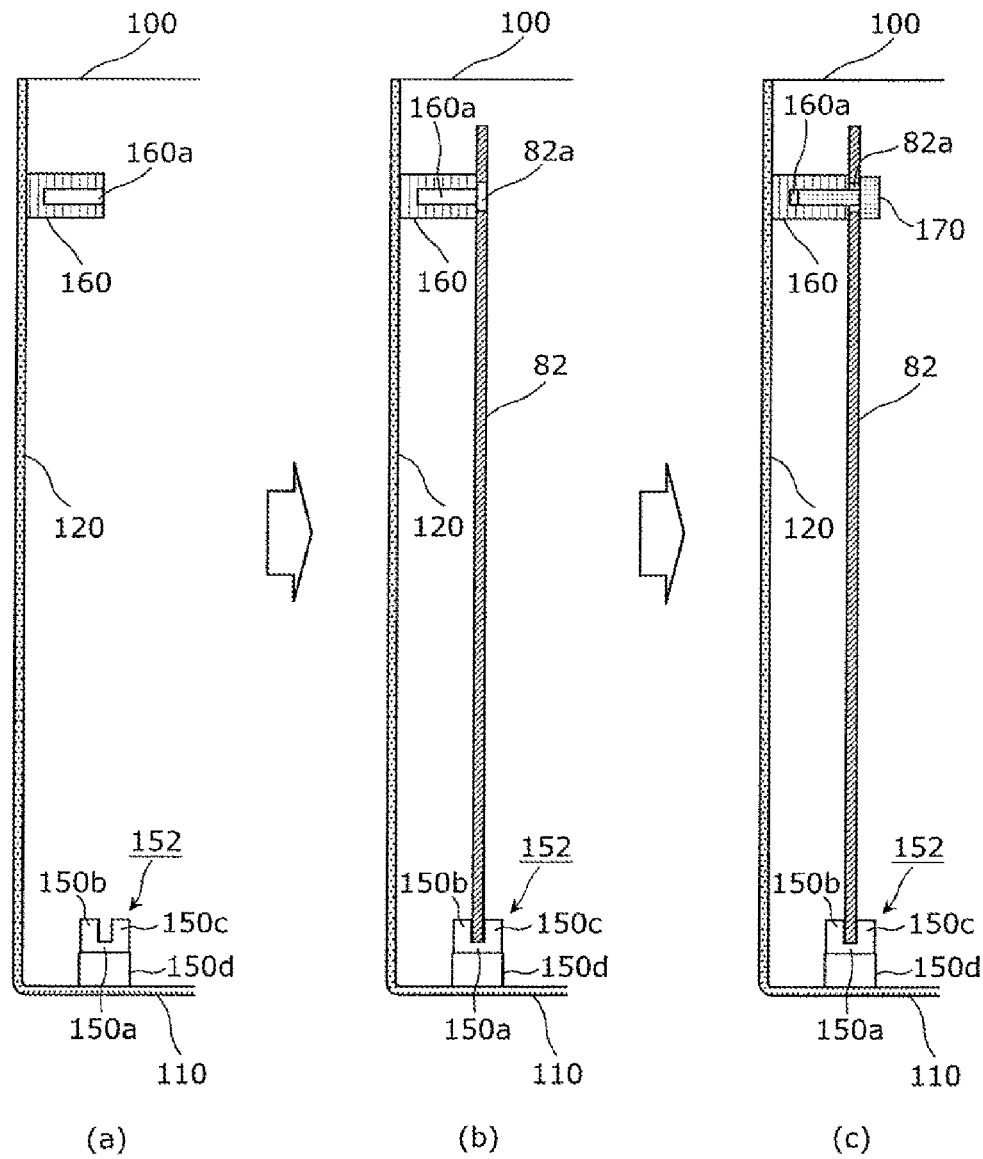
FIG. 7 is a cross-sectional view showing the configuration where the main circuit board is fixed to the outer case body according to the embodiment of the present invention.
Figure 7:
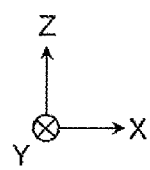

FIG. 7 is a cross-sectional view showing the configuration where the main circuit board 82 is fixed to the outer case body 100 according to the embodiment of the present invention. To be more specific, FIG. 7 is the cross-sectional view of the configuration shown in FIG. 6 taken along line VII-VII, wherein (a) of FIG. 7 is a cross-sectional view showing the configuration of the outer case body 100, (b) of FIG. 7 is a cross-sectional view of the outer case body 100 in a state where the main circuit board 82 is disposed in the outer case body 100, and (c) of FIG. 7 is a cross-sectional view of the outer case body 100 in a state where the main circuit board 82 is fixed to the outer case body 100.

First, as shown in FIG. 6, and (a) and (b) of FIG. 7, the lower end portion (the end portion on the minus side in the Z axis direction) of the main circuit board 82 is inserted in a recessed portion formed between the projecting portion 150b and the projecting portion 150c of each first restricting portion 152 of the outer case body 100. The recessed portion is a portion surrounded by the base portion 150a, the projecting portion 150b, and the projecting portion 150c, and the main circuit board 82 is inserted in the recessed portion until an end surface of the lower end portion of the main circuit board 82 is brought into contact with an upper surface of the base portion 150a.

With such a configuration, the first restricting portions 152 restrict the movement of the main circuit board 82 in a direction along the bottom wall 110. To be more specific, the first restricting portions 152 restrict the movement of the main circuit board 82 in a direction toward the bottom wall 110 (the minus side in the Z axis direction) and in a direction along the bottom wall 110 (X axis direction) by being brought into contact with the main circuit board 82.

That is, the first restricting portions 152 restrict the movement of the main circuit board 82 in a direction toward the bottom wall 110 by bringing the base portions 150a into contact with the end surface of the lower end portion of the main circuit board 82. The first restricting portions 152 restrict the movement of the main circuit board 82 in a direction along the bottom wall 110, that is, in a direction toward the side wall 120 (toward the minus side in the X axis direction) by bringing the projecting portions 150b into contact with a side surface of the lower end portion of the main circuit board 82. Further, the first restricting portions 152 restrict the movement of the main circuit board 82 in a direction along the bottom wall 110, that is, in a direction toward the side wall 130 (toward the plus side in the X axis direction) by bringing the projecting portions 150c into contact with a side surface of the lower end portion of the main circuit board 82.

Similarly as the main circuit board 82, also with respect to the measuring circuit board 81, a lower end portion of the measuring circuit board 81 is inserted in the recessed portion which is formed between the projecting portion 150b and the projecting portion 150c of each first restricting portion 151. The first restricting portions 151 restrict the movement of the measuring circuit board 81 in a direction along the bottom wall 110. That is, the first restricting portions 151 restrict the movement of the measuring circuit board 81 in a direction toward the bottom wall 110 (toward the minus side in the Z axis direction) and in a direction along the bottom wall 110 (in a direction toward the plus side and the minus side in the Y axis direction) by being brought into contact with the measuring circuit board 81.

As shown in (c) of FIG. 7, fixing members 170 such as screws are inserted into the fixing opening portions 82a of the main circuit board 82 and are fixed by screwing to female threaded portions 160a of the fixing portions 160 and hence, the main circuit board 82 is fixed to the fixing portions 160. That is, the fixing portions 160 are disposed on the inner surface of the side wall 120 at positions corresponding to the fixing opening portions 82a of the upper end portion of the main circuit board 82, and the upper end portion of the main circuit board 82 is fixed to the fixing portions 160 in a state where the lower end portion of the main circuit board 82 is inserted into the recessed portions of the first restricting portions 152.

Similarly as the main circuit board 82, also with respect to the measuring circuit board 81, the fixing portions 220 are disposed on the inner surface of the side wall 210 of the measuring circuit board 81 at positions corresponding to the fixing opening portions 81a of the upper end portion of the measuring circuit board 81, and the upper end portion of the measuring circuit board 81 is fixed to the fixing portions 220 in a state where the lower end portion of the measuring circuit board 81 is inserted into the recessed portions of the first restricting portions 151.

The main circuit board 82 is fixed to the inner surface of the side wall 120 by the first restricting portions 152 and the fixing portions 160 in the manner describe above, and the measuring circuit board 81 is fixed to the inner surface of the side wall 210 by the first restricting portions 151 and the fixing portions 220 in the manner describe above.

Next, the arrangement positions of the measuring circuit board 81 and the main circuit board 82 in the inside of the outer case 10 are described in detail.

Figure 8:
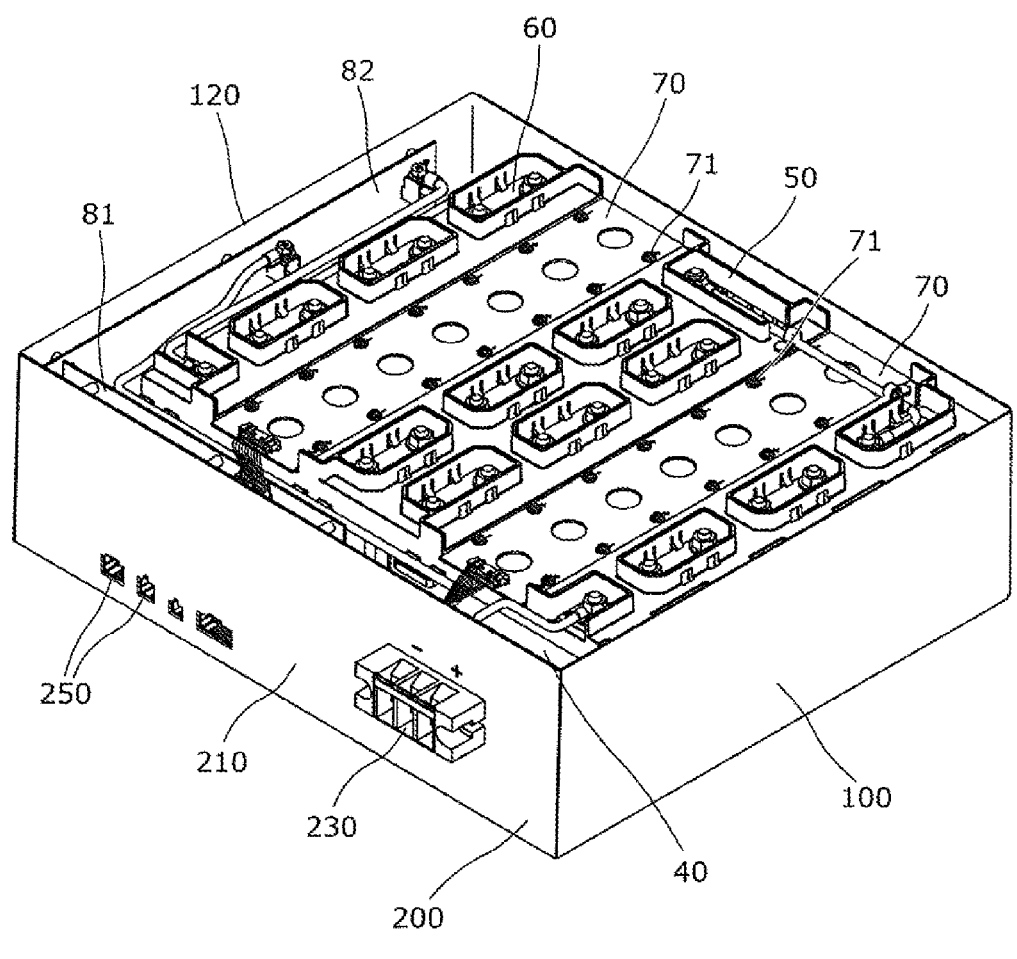
FIG. 8 is a perspective view showing a state where the measuring circuit board and the main circuit board according to the embodiment of the present invention are disposed in the inside of an outer case.

FIG. 8 is a perspective view showing a state where the measuring circuit board 81 and the main circuit board 82 according to the embodiment of the present invention are disposed in the inside of the outer case 10. To be more specific, FIG. 8 is a perspective view showing a state where the upper wall portion 300 is removed from the energy storage apparatus 1 shown in FIG. 1.

Figure 9:
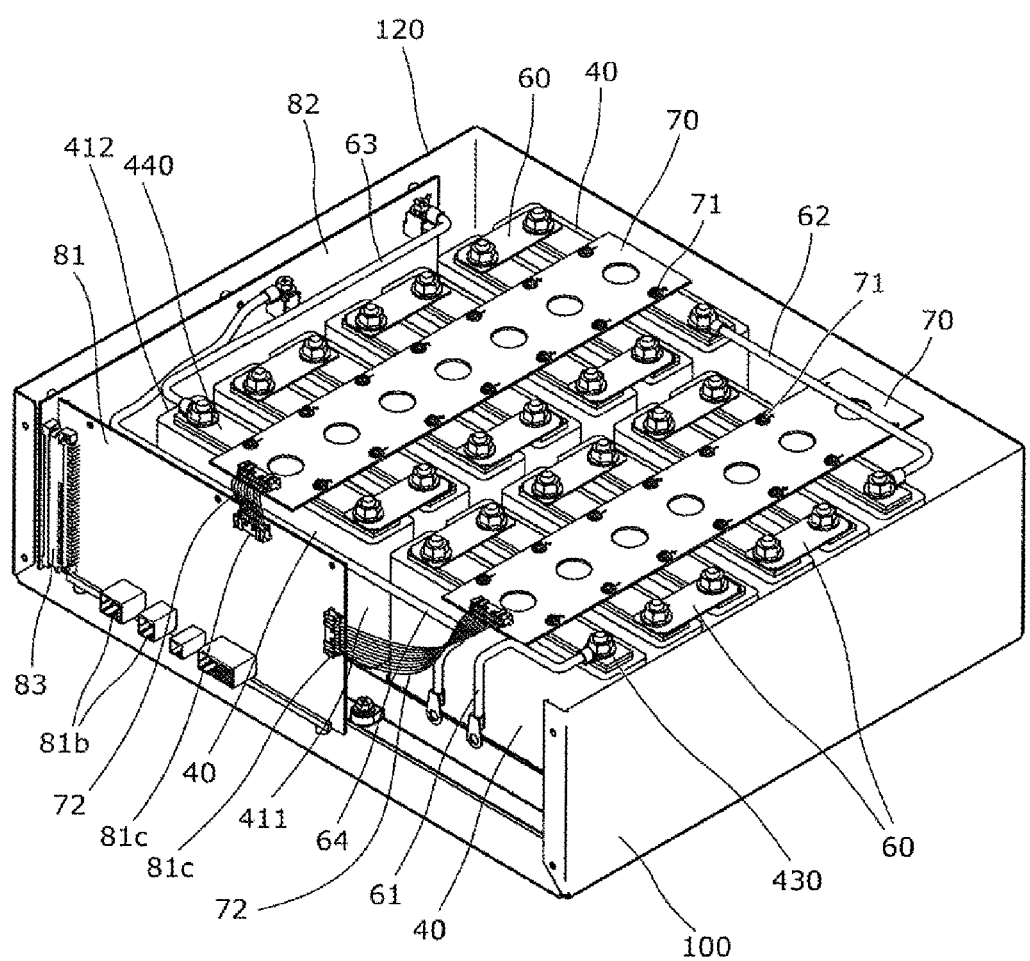
FIG. 9 is a perspective view showing a state where the measuring circuit board and the main circuit board according to the embodiment of the present invention are disposed in the inside of the outer case while omitting a terminal-side arrangement member.

FIG. 9 is a perspective view showing a state where the measuring circuit board 81 and the main circuit board 82 according to the embodiment of the present invention are disposed in the inside of the outer case 10 while omitting the terminal-side arrangement member 50. That is, FIG. 9 is a perspective view showing the configuration where the terminal-side arrangement member 50 is omitted from the configuration shown in FIG. 8. Although the terminal-side arrangement member 50 is not omitted in the actual configuration, FIG. 9 shows the configuration while omitting the terminal-side arrangement member 50 for the sake of convenience of the description.

Figure 10:
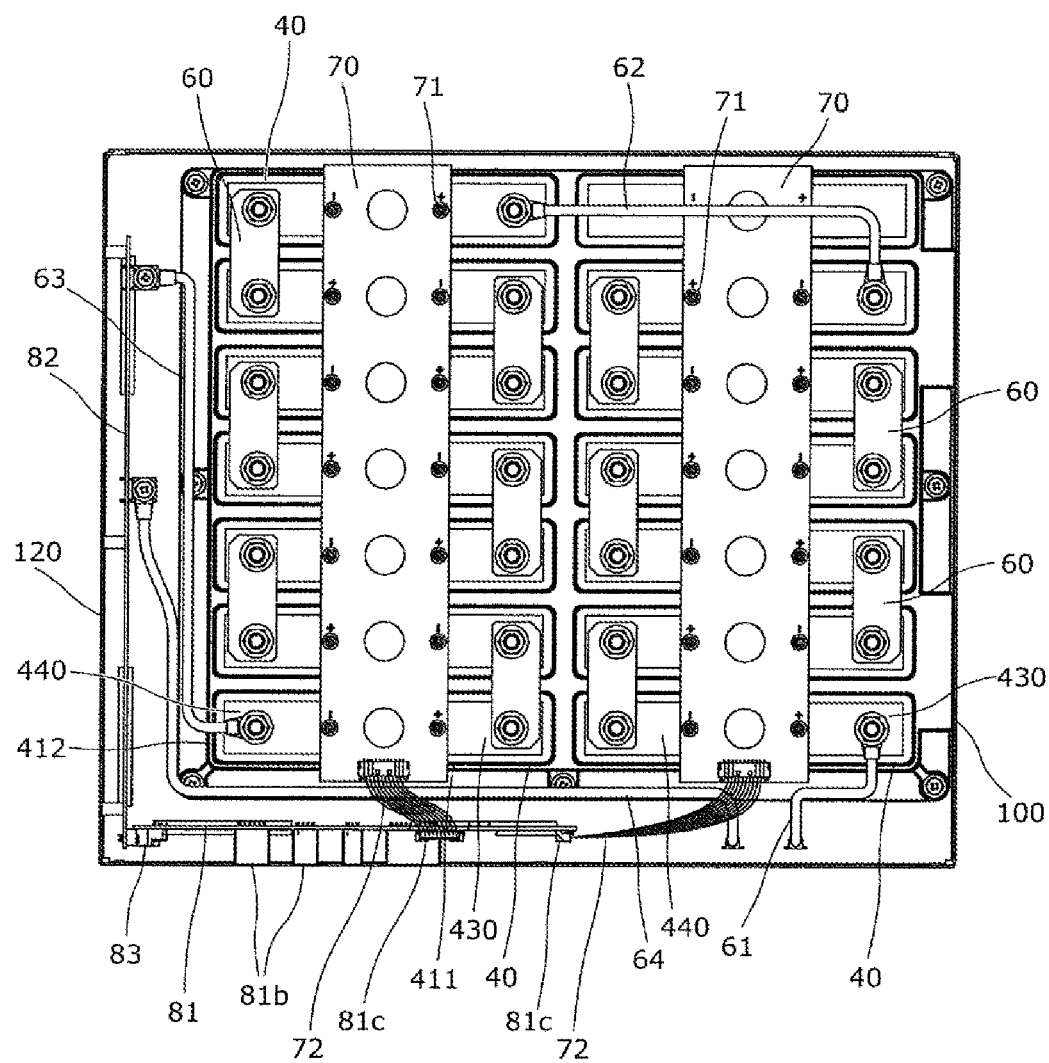
FIG. 10 is a plan view showing the state where the measuring circuit board and the main circuit board according to the embodiment of the present invention are disposed in the inside of the outer case while omitting the terminal-side arrangement member.

FIG. 10 is a plan view showing a state where the measuring circuit board 81 and the main circuit board 82 according to the embodiment of the present invention are disposed in the inside of the outer case 10 while omitting the terminal-side arrangement member 50. That is, FIG. 10 is a top plan view showing the configuration in a state shown in FIG. 9 as viewed from the plus side in the Z axis direction.

As shown in these drawings, the measuring circuit board 81 and the main circuit board 82 are fixed to the inner wall surface of the outer case 10. That is, the measuring circuit board 81 and the main circuit board 82 are disposed along the inner surface of the side walls of the outer case 10, and are fixed to the inner surface.

To be more specific, the measuring circuit board 81 (first circuit board) is disposed parallel to and along an inner surface of the side wall 210 of the front wall portion 200 (disposed in a vertical direction or disposed perpendicular to the bottom wall 110), and is fixed to the inner surface. The main circuit board 82 (second circuit board) is disposed parallel to and along an inner surface of the side wall 120 of the outer case body 100 (disposed in a vertical direction or disposed perpendicular to the bottom wall 110), and is fixed to the inner surface. It is sufficient that the measuring circuit board 81 and the main circuit board 82 be disposed substantially parallel to the corresponding inner surfaces respectively.

To be further more specific, the measuring circuit board 81 is disposed such that the measuring circuit board 81 opposedly faces the long side surface 411 of the container 410 of the energy storage device 40, and the main circuit board 82 is disposed such that the main circuit board 82 opposedly faces the position different from the long side surface 411. That is, the main circuit board 82 is disposed such that the main circuit board 82 opposedly faces the short side surface 412 of the container 410 of the energy storage device 40.

In other words, the measuring circuit board 81 is disposed along an inner surface of a first wall of the outer case 10 (in this embodiment, is disposed parallel to the inner surface of the first wall), and the main circuit board 82 is disposed along an inner surface of a second wall which is disposed adjacently to the first wall of the outer case 10 (in this embodiment, disposed parallel to the inner surface of the second wall). That is, the measuring circuit board 81 and the main circuit board 82 are disposed (fixed) along the inner surfaces of two walls of the outer case 10 disposed adjacently to each other.

For example, assume a case where the measuring circuit board 81 has a bent shape, and is disposed such that the measuring circuit board 81 opposedly faces both the long side surface 411 and the short side surface 412 of the container 410 of the energy storage device 40 (disposed along inner surfaces of both first wall and second wall of the outer case 10). In this case, it is sufficient that the main electronic parts mounted on the measuring circuit board 81 be disposed such that the main electronic parts opposedly face the long side surface 411 (disposed along the inner surface of the first wall). Similarly as the measuring circuit board 81, also with respect to the main circuit board 82, it is sufficient that the main electronic parts mounted on the main circuit board 82 be disposed such that the main electronic parts opposedly faces a position (short side surface 412) different from the long side surface 411 (disposed along the inner surface of the second wall).

In the manner, on the minus side in the X axis direction and the minus side in the Y axis direction of the energy storage device 40, a space is formed in an L shape, and the measuring circuit board 81 and the main circuit board 82 which are formed in an L shape are disposed in the L-shaped space. The measuring circuit board 81 may be disposed in an inclined manner with respect to the inner surface of the first wall of the outer case 10, and the main circuit board 82 may be disposed in an inclined manner with respect to the inner surface of the second wall of the outer case 10. As described above, it is sufficient that at least one of the measuring circuit board 81 and the main circuit board 82 be fixed to the inner wall surface of the outer case 10. In this case, a circuit board which is not fixed to the inner wall surface of the outer case 10 may be fixed to the bottom-surface-side arrangement member 20 or the energy storage device 40, for example.

The measuring circuit board 81 is connected with the energy storage devices 40 via the wiring circuit boards 70 and, at the same time, is connected with the main circuit board 82 and the external equipment. That is, the wiring circuit boards 70 are respectively connected with the positive electrode terminals 430 of the plurality of energy storage devices 40 at detection parts 71 thereof, and the measuring circuit board 81 is connected with the wiring circuit boards 70 using wirings 72 via the connectors 81c. The measuring circuit board 81 is connected with the main circuit board 82 by the circuit-board to circuit-board connector 83. Further, the measuring circuit board 81 is connected with the external equipment via the connector-use opening portions 250 of the front wall portion 200 and the connectors 81b.

The main circuit board 82 is connected to the energy storage devices 40, the external connection terminal 230, and the measuring circuit board 81. That is, a positive-electrode-side external terminal of the external connection terminal 230 and the positive electrode terminal 430 of the energy storage device 40 disposed at one end of the energy storage apparatus 1 are connected to each other using a first wiring 61, and with respect to the energy storage devices 40 disposed adjacently to each other, the negative electrode terminal 440 of one energy storage device 40 and the positive electrode terminal 430 of another energy storage device 40 are connected to each other using the bus bar 60 or a second wiring 62. Further, the negative electrode terminal 440 of the energy storage device 40 disposed at the other end of the energy storage apparatus 1 and the main circuit board 82 are connected to each other using a third wiring 63, and the main circuit board 82 and a negative-electrode-side external terminal of the external connection terminal 230 are connected to each other using a fourth wiring 64.

Next, the configuration of the bottom-surface-side arrangement member 20, the configuration of the outer case body 100, and one example of the relationship between these members are described in detail.

Figure 11:
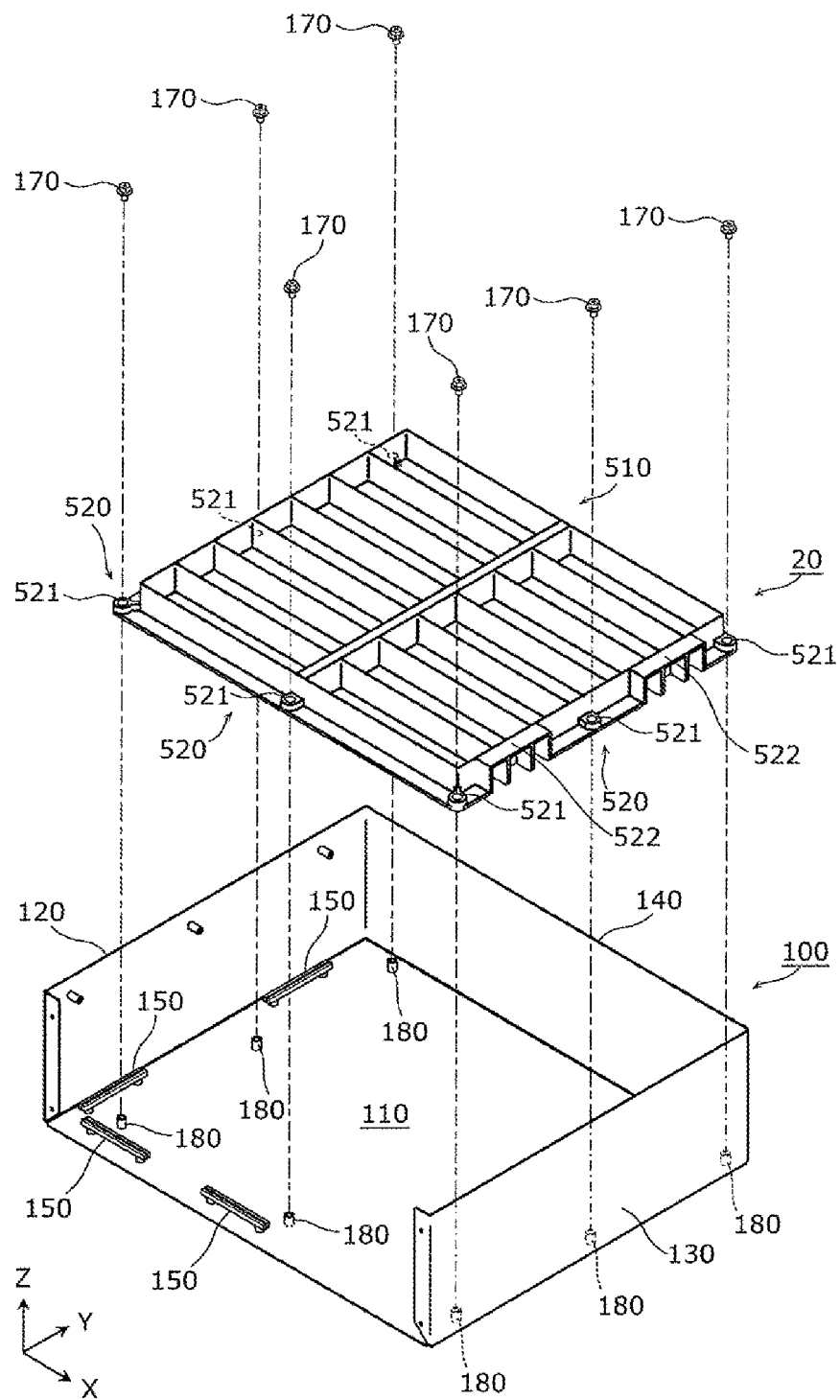
FIG. 11 is a perspective view showing the configuration before a bottom-surface-side arrangement member is fixed to the outer case body according to the embodiment of the present invention.
Figure 12:
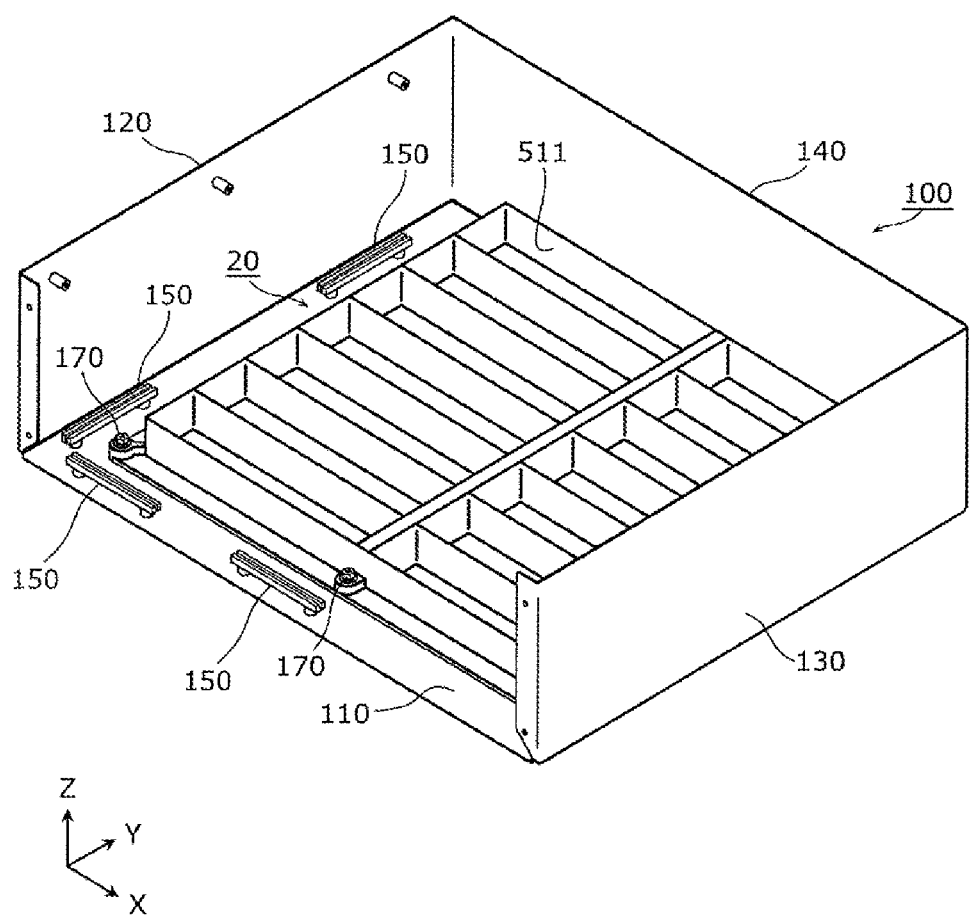
FIG. 12 is a perspective view showing the configuration after the bottom-surface-side arrangement member is fixed to the outer case body according to the embodiment of the present invention.
Figure 13:
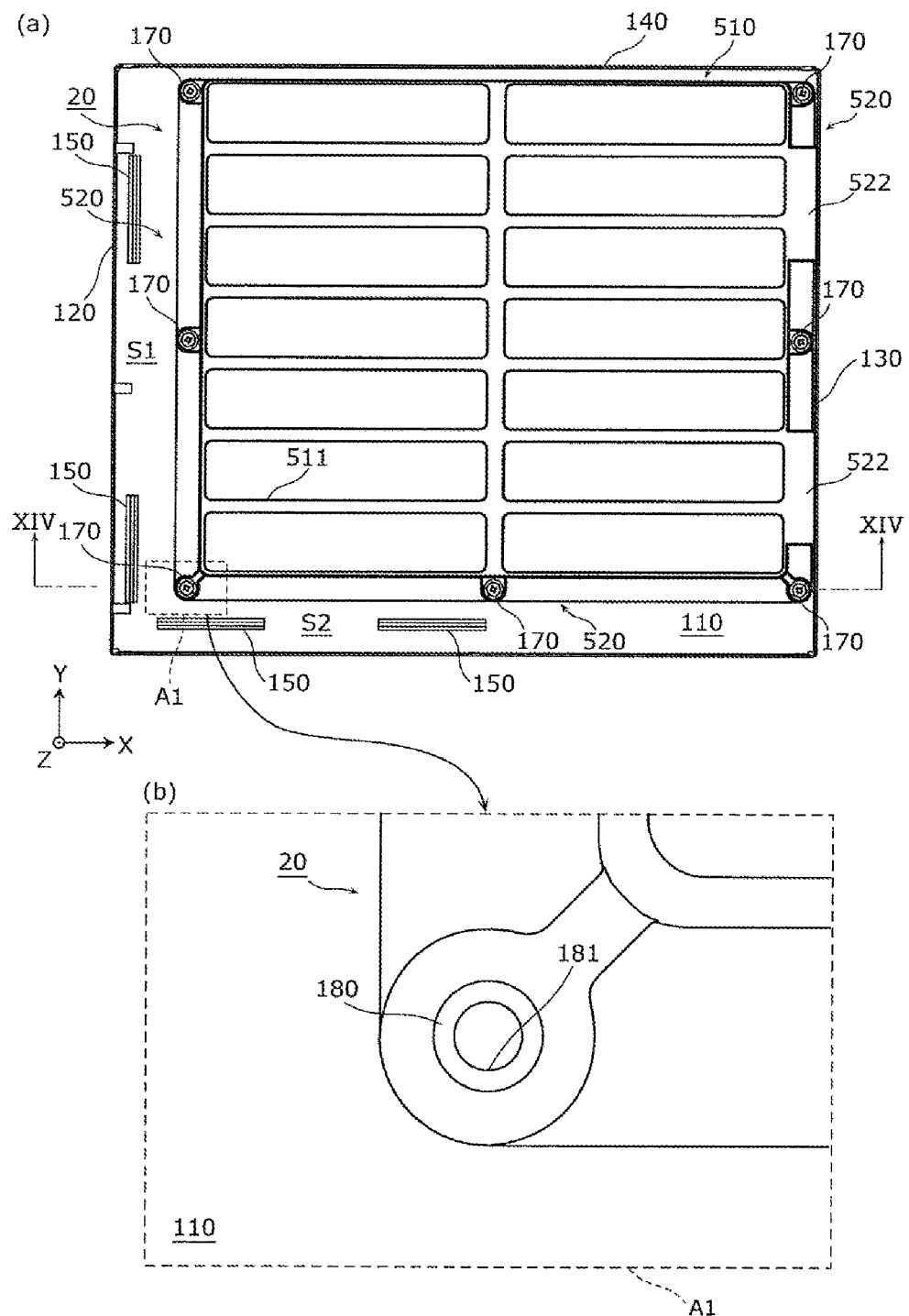
FIG. 13 is a plan view showing the configuration after the bottom-surface-side arrangement member is fixed to the outer case body according to the embodiment of the present invention.

FIG. 11 is a perspective view showing a configuration before the bottom-surface-side arrangement member 20 is fixed to the outer case body 100 according to the embodiment of the present invention. FIG. 12 is a perspective view showing a configuration after the bottom-surface-side arrangement member 20 is fixed to the outer case body 100 according to the embodiment of the present invention. FIG. 13 is a plan view showing the configuration after the bottom-surface-side arrangement member 20 is fixed to the outer case body 100 according to the embodiment of the present invention. Here, (a) of FIG. 13 is a plan view (top plan view) as viewed from the plus side in the Z axis direction, and (b) of FIG. 13 is an enlarged view of a region A1 in (a) of FIG. 13 in a state where the fixing member 170 is omitted.

First, the configuration of the bottom-surface-side arrangement member 20 is described in detail.

As shown in FIG. 11 to FIG. 13, the bottom-surface-side arrangement member 20 includes: a holding portion 510 which is a portion for holding the plurality of energy storage devices 40; and portion to be mounted 520 which are portions disposed outside both sides of the holding portion 510 in the X axis direction and on the minus side in the Y axis direction and are mounted on the bottom wall of the outer case body 100.

On an upper surface of the holding portion 510, a plurality of recessed portions 511 are formed, and a portion of the energy storage device 40 on a bottom surface side of the energy storage device 40 (on the minus side in the Z axis direction) can be inserted in each recessed portion 511. The plurality of recessed portions 511 hold the plurality of energy storage devices 40 by restricting the movement of the plurality of energy storage devices 40 inserted into the plurality of recessed portions 511 respectively. To be more specific, the plurality of recessed portions 511 restrict the movement of the plurality of energy storage devices 40 in a direction along the inner surface of the bottom wall (a surface on the plus side in the Z axis direction, hereinafter referred to as "bottom wall surface") of the outer case body 100. Further, the plurality of recessed portions 511 support the bottom surfaces of the plurality of energy storage devices 40 from below. To be more specific, "direction along the bottom wall surface" in this specification means any one of a direction along the X axis direction, a direction along the Y axis direction, and a direction obtained by synthesizing an X axis direction component and a Y axis direction component.

In the portion to be mounted 520, seven opening portions 521 which penetrate the portion to be mounted 520 in a thickness direction (Z axis direction) of the bottom-surface-side arrangement member 20 are formed. In this embodiment, the opening portion 521 is a through hole where a cross-sectional shape of the inner surface of the opening portion 521 has a circular shape. However, a cross-sectional shape of the inner surface of the through hole is not limited to a circular shape, and may be a polygonal shape such as a triangular shape or a rectangular shape. The number of opening portions 521 is not limited to seven, and may be a plural number other than seven or may be one.

As shown in FIG. 11 and FIG. 13, two projecting portions 522 which project toward a side wall 130 side (that is, toward the plus side in the X axis direction) are formed on the portion to be mounted 520. Two projecting portions 522 project by lengths substantially equal to each other toward the side wall 130 side on the portion to be mounted 520. Two projecting portions 522 may not be formed on the bottom-surface-side arrangement member 20.

Next, the configuration of the outer case body 100 is descried in more detail.

As shown in FIG. 11 to FIG. 13, the outer case body 100 includes the bottom wall 110 and the side walls 120 to 140 as described above, and second restricting portions 180 are also mounted on the bottom wall surface (the inner surface of the bottom wall 110) in addition to the first restricting portions 150.

The second restricting portions 180 are convex portions projecting from the inner surface of the bottom wall 110, and in this embodiment, seven second restricting portions 180 are provided. Seven second projecting portions 180 are disposed at positions corresponding to seven opening portions 521 of the bottom-surface-side arrangement member 20. To be more specific, the second restricting portions 180 are convex portions projecting in a circular columnar shape, and are provided for fixing the seven opening portions 521 of the bottom-surface-side arrangement member 20 to the bottom wall 110 using fixing members 170 such as screws. It is sufficient that the number of second restricting portions 180 be equal to the number of opening portions 521 of the bottom-surface-side arrangement member 20, and is not limited to seven. The number of second restricting portions 180 may be a plural number other than seven or may be one.

Each second restricting portion 180 is formed of a metal-made boss, for example, and is integrally fixed with the bottom wall 110 by swaging. The second restricting portion 180 may be integrally fixed with the bottom wall 110 by welding. A material for forming the second restricting portion 180 is not limited to metal, and the second restricting portion 180 may be made of a material such as a resin.

Next, the position at which the bottom-surface-side arrangement member 20 is disposed in the outer case body 100 is described in detail.

As shown in FIG. 11 to FIG. 13, the bottom-surface-side arrangement member 20 is placed at a predetermined position of the bottom wall surface. To be more specific, the bottom-surface-side arrangement member 20 is smaller than the outer case body 100, and is disposed at the position in an offset manner with respect to the outer case body 100. With such a configuration, an L-shaped space is formed between the bottom-surface-side arrangement member 20 and the outer case body 100. For example, as shown in (a) of FIG. 13, the L-shaped space includes: a space S1 formed between the end portion of the bottom-surface-side arrangement member 20 on the minus side in the X axis direction and the side wall 120; and a space S2 formed between the end portion of the bottom-surface-side arrangement member 20 on the minus side in the Y axis direction and the position at which the front wall portion 200 is disposed.

As shown in (a) of FIG. 13, the first restricting portions 150 are disposed at positions in the outer case body 100 where the L-shaped space is formed. That is, the measuring circuit board 81 and the main circuit board 82 which are connected to each other in an L shape can be disposed in the L-shaped space. Accordingly, the L-shaped space which is formed by disposing the bottom-surface-side arrangement member 20 which holds the energy storage devices 40 in an offset manner with respect to the outer case body 100 can be effectively used thus realizing the downsizing of the energy storage apparatus 1. In the L-shaped space, besides the measuring circuit board 81 and the main circuit board 82, parts such as a relay, a shunt resistor, a Hall sensor, a pre-charge resistor and the like may be disposed. Since these parts are disposed in the L-shaped shape, the downsizing of the energy storage apparatus can be realized.

As shown in (b) in FIG. 13, the second restricting portions 180 restrict the movement of the bottom-surface-side arrangement member 20 by being fitted in the opening portions 521 which are portions of the bottom-surface-side arrangement member 20. That is, the bottom-surface-side arrangement member 20 includes the opening portions 521 into which the second restricting portions 180 are fitted.

The second restricting portions 180 mounted on the bottom wall 110 of the outer case body 100 are fitted in the plurality of opening portions 521 respectively and hence, the movement of the bottom-surface-side arrangement member 20 along the bottom wall surface is restricted at plural portions. Accordingly, even when a force in a direction along the bottom wall surface is applied to the bottom-surface-side arrangement member 20, the rotational movement of the bottom-surface-side arrangement member 20 using one opening portion 521 as a fulcrum can be suppressed.

The second restricting portion 180 is fitted in the opening portion 521 and hence, the second restricting portion 180 is brought into contact with the opening portion 521 in all directions along the bottom wall surface. With such a configuration, even when a state arises where a force is applied to the bottom-surface-side arrangement member 20 from any direction among directions along the bottom wall surface, the second restricting portions 180 can restrict the movement of the bottom-surface-side arrangement member 20 in a direction along the bottom wall surface.

Next, the configuration where the bottom-surface-side arrangement member 20 is fixed to the outer case body 100 is described in detail.

Figure 14:
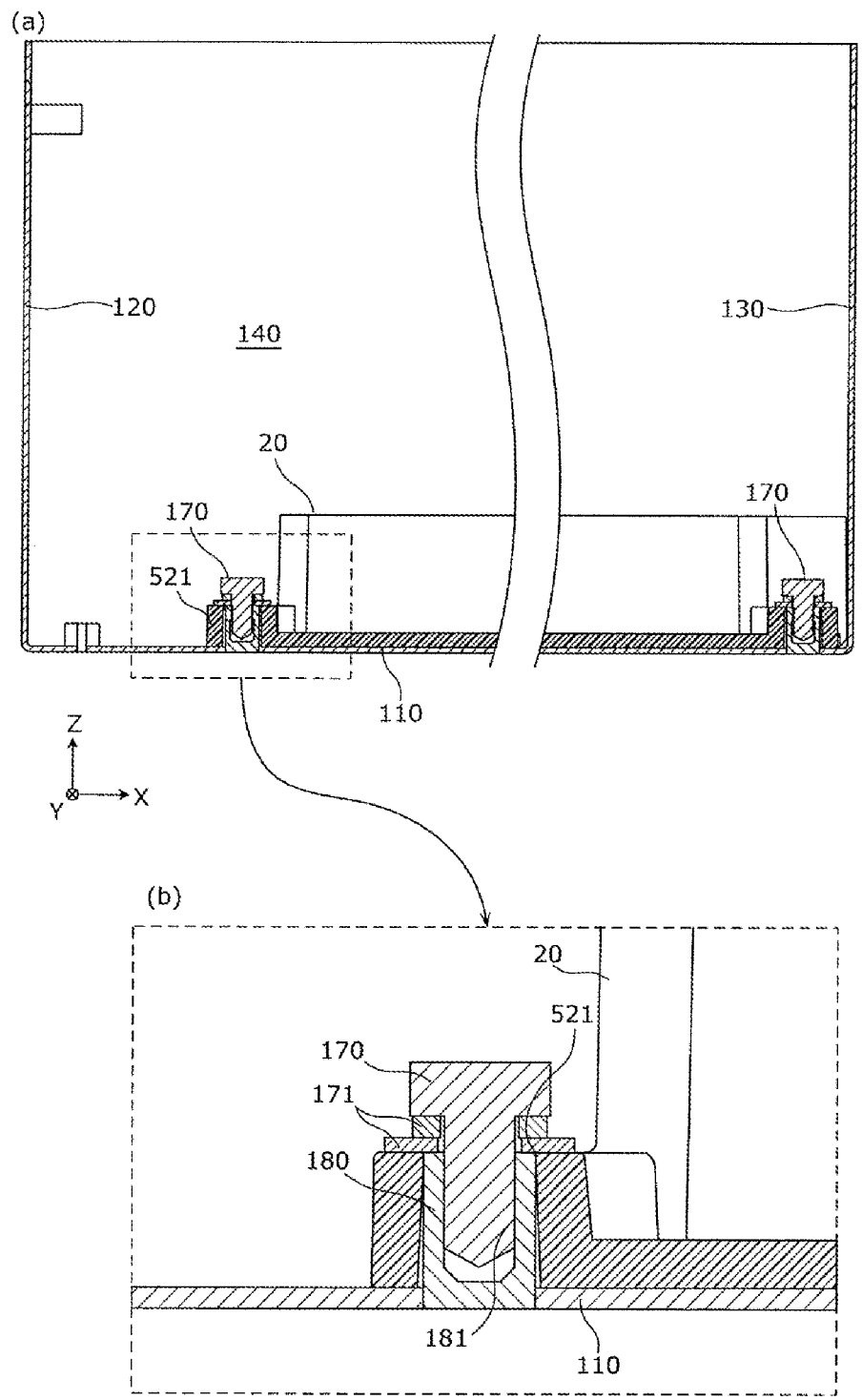
FIG. 14 is a cross-sectional view taken along an X-Z plane showing the configuration after the bottom-surface-side arrangement member is fixed to the outer case body according to the embodiment of the present invention.

FIG. 14 is a cross-sectional view taken along an X-Z plane of the configuration acquired after the bottom-surface-side arrangement member 20 is fixed to the outer case body 100 according to the embodiment of the present invention. To be more specific, (a) of FIG. 14 is a cross-sectional view taken along line XIV-XIV in (a) in FIG. 13, and (b) of FIG. 14 is an enlarged view of the fixing member 170 and the configuration around the fixing member 170 in (a) of FIG. 14. To be more specific, (b) of FIG. 14 is an enlarged view of the region A1 in (a) of FIG. 13.

As shown in FIG. 14, the bottom-surface-side arrangement member 20 is fixed to the bottom wall surface in such a manner that seven fixing members 170 are connected to the seven second restricting portions 180 respectively in a state where the second restricting portions 180 are made to pass through the opening portions 521 of the portion to be mounted 520 of the bottom-surface-side arrangement member 20. To be more specific, the fixing members 170 such as screws or the like are threadedly engaged with female threaded portions 181 formed in the second restricting portions 180 respectively so that the fixing members 170 are fixed to the second restricting portions 180 respectively whereby the bottom-surface-side arrangement member 20 is fixed to the bottom wall 110. Accordingly, the bottom-surface-side arrangement member 20 can be firmly fixed to the bottom wall 110 of the outer case body 100 by way of the second restricting portions 180 with the simple and inexpensive configuration.

It is preferable that the fixing member 170 be threadedly engaged with the female threaded portion 181 by way of a washer (sheet metal) 171 such as a spring washer or a flat washer for preventing the occurrence of loosening and depression with respect to the female threaded portion 181. However, the washer 171 may not be used.

The female threaded portion 181 which is threadedly engaged with the fixing member 170 is formed in each second restricting portion 180 which projects from the bottom wall surface. In this manner, the second projecting portions 180 project from the bottom wall surface toward the inside and hence, the female threaded portions 181 can be disposed inside the outer case body 100. That is, by threadedly engaging the fixing members 170 with the female threaded portions 181 from the inside of the outer case 10, a length of a portion where the fixing members 170 and the female threaded portions 181 are threadedly engaged with each other can be ensured, and the threadedly engaging portions can be disposed inside the outer case body 100. Accordingly, the bottom-surface-side arrangement member 20 can be fixed even when the fixing members 170 are not disposed outside the outer case 10. Further, even when the fixing members 170 are disposed inside the outer case 10, the bottom-surface-side arrangement member 20 and the outer case body 100 can be firmly fixed to each other without adopting the configuration where the fixing members 170 penetrate the outer case body 100 and project from the outer case body 100.

As shown in FIG. 13, the portion to be mounted 520 in which the opening portions 521 are formed is disposed on the side of the recessed portions 511 of the holding portion 510. Accordingly, the second restricting portions 180 restrict the movement of the bottom-surface-side arrangement member 20 in a direction along the bottom wall surface at positions which do not overlap with the energy storage devices 40 as viewed from the plus side in the Z axis direction. In this manner, the second restricting portions 180 are disposed at positions where the second restricting portions 180 do not overlap with the energy storage devices 40 as viewed from the plus side in the Z axis direction and hence, the space in the inside of the outer case 10 in the Z axis direction can be increased by an amount that the second restricting portions 180 do not overlap with the energy storage devices 40. A size of the outer case 10 in the Z axis direction can be decreased by an amount that the space in the Z axis direction can be increased. Further, a size in the energy storage device in the Z axis direction can be increased by an amount that the space in the Z axis direction can be increased.

The fixing members 170 can be mounted at positions where the fixing members 170 do not overlap with the energy storage devices 40 and hence, irrespective of the arrangement situation of the energy storage devices 40 on the bottom-surface-side arrangement member 20, a mounting operation of the fixing members 170 can be performed. Accordingly, operation efficiency can be enhanced.

Next, the positional relationship between the outer case 10, the energy storage devices 40, the bottom-surface-side arrangement member 20, and the terminal-side arrangement member 50 in the Z axis direction is described in detail.

Figure 15:
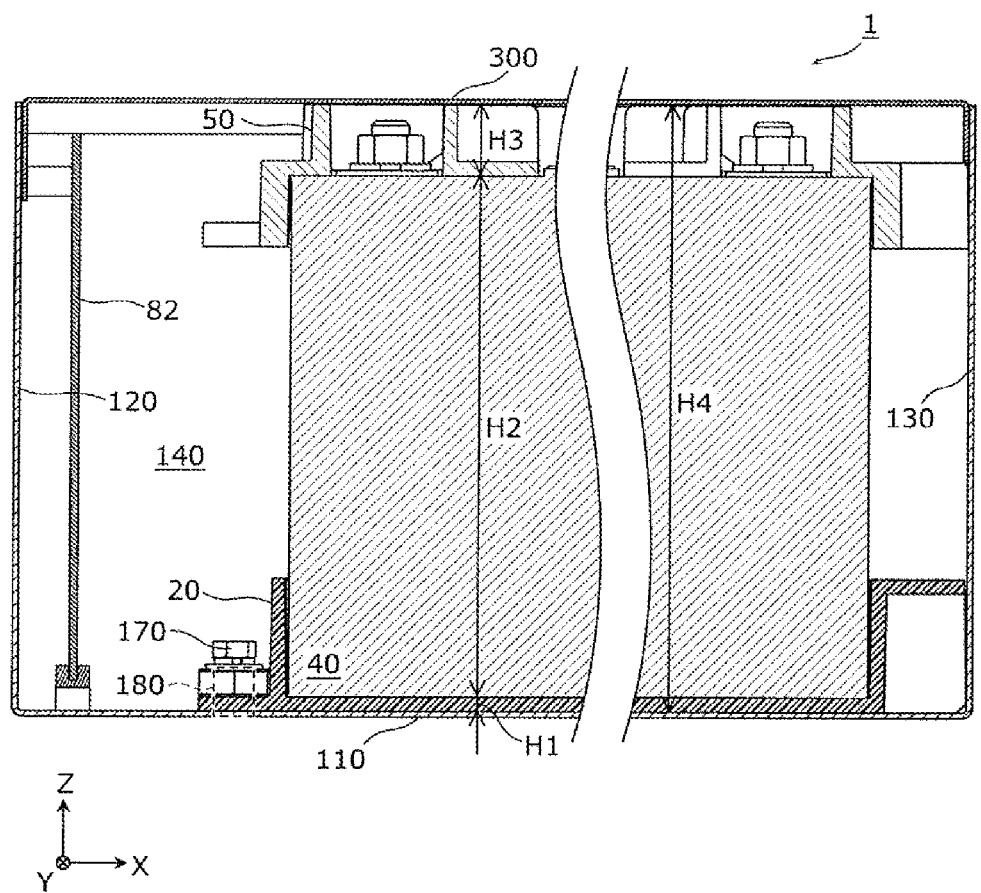
FIG. 15 is a cross-sectional view of the energy storage apparatus according to the embodiment of the present invention taken along an X-Z plane

FIG. 15 is a cross-sectional view of the energy storage apparatus 1 according to the embodiment of the present invention taken along the X-Z plane. To be more specific, FIG. 15 is a cross-sectional view of the energy storage apparatus 1 shown in FIG. 1 taken along the X-Z plane.

As shown in FIG. 15, the bottom wall 110 and the upper wall portion 300 of the outer case body 100 are disposed such that the bottom wall 110 and the upper wall portion 300 sandwich the bottom-surface-side arrangement member 20, the energy storage devices 40, and the terminal-side arrangement member 50 in this order. The sum of a length (hereinafter referred to as "height") H1 of the bottom-surface-side arrangement member 20 in the Z axis direction, a height H2 of the energy storage device 40 in the Z axis direction, and a height H3 of the terminal-side arrangement member 50 in the Z axis direction is substantially equal to a distance H4 between the bottom wall 110 and the upper wall portion 300. That is, the bottom wall 110 and the upper wall portion 300 are disposed so as to prevent the bottom-surface-side arrangement member 20, the energy storage devices 40, and the terminal-side arrangement member 50 from spreading in the arrangement direction of these components (Z axis direction).

With such a configuration, for example, even when the opening portions 521 of the bottom-surface-side arrangement member 20 and the second restricting portions 180 of the outer case body 100 are not fixed to each other by the fixing members 170, a state where the second restricting portions 180 are respectively fitted in the opening portions 521 can be maintained.

As described above, the energy storage apparatus 1 according to the embodiment of the present invention includes: the measuring circuit board 81 which forms the first circuit board; and the main circuit board 82 which forms the second circuit board. The first circuit board is disposed such that the first circuit board opposedly faces the long side surface 411 of the container 410 of the energy storage device 40, and the second circuit board through which an electric current larger than an electric current flowing in the first circuit board flows is disposed such that the second circuit board opposedly faces a position different from the long side surface 411. That is, in general, the energy storage device 40 generates a large amount of heat from the long side surface 411 side of the container 410. Accordingly, the first circuit board in which heat is minimally generated due to the flow of a small electric current flowing through the first circuit board is disposed on the long side surface 411 side, and the second circuit board which is liable to generate heat due to the flow of a large electric current flowing through the second circuit board is disposed on a side different from the long side surface 411 side thus suppressing the further generation of heat in the second circuit board attributed to heat from the energy storage device 40. In this manner, by arranging the first circuit board and the second circuit board by taking into account a magnitude of an adverse effect which the heat from the energy storage device 40 exerts, it is possible to suppress an adverse effect on the circuit boards caused by the energy storage device 40.

In the energy storage apparatus 1, the second circuit board is disposed such that the second circuit board opposedly faces the short side surfaces 412 of the containers 410 of the energy storage devices 40. That is, the first circuit board is disposed on the long side surface 411 side of the container 410 of the energy storage device 40, and the second circuit board is disposed on the short side surface 412 side of the container 410 of the energy storage device 40. With such a configuration, two circuit boards can be disposed by making use of a dead space on the long side surface 411 side and the short side surface 412 side of the container 410 of the energy storage device 40 and hence, it is possible to realize downsizing of the energy storage apparatus 1.

Two circuit boards are disposed along the inner surfaces of two walls of the outer case 10 which are disposed adjacently to each other. With such a configuration, two circuit boards can be disposed by making use of a vacant space formed by displacing the energy storage devices 40 to the corner in the outer case 10. Accordingly, downsizing of the energy storage apparatus 1 can be realized. That is, in this embodiment, an L-shaped dead space is formed on the minus side in the X axis direction and on the minus side in the Y axis direction of the energy storage devices 40 and hence, the measuring circuit board 81 and the main circuit board 82 which are formed in an L shape can be disposed in the L-shaped dead space. In this manner, downsizing of the energy storage apparatus 1 can be realized by effectively making use of the dead space in the inside of the energy storage apparatus 1. Further, a distance between two circuit boards can be shortened and hence, two circuit boards can be easily connected to each other at a low cost by directly connecting two circuit boards using the circuit-board to circuit-board connector 83 or the like.

At least one of two circuit boards is fixed to the inner wall surface of the outer case 10 and hence, the circuit board is disposed away from the energy storage devices 40. Accordingly, it is possible to suppress the occurrence of a phenomenon that heat from the energy storage device 40 is transmitted to the circuit board and adversely affects the circuit board. Further, it is possible to suppress the occurrence of a phenomenon that noise occurs in a circuit disposed in the inside of the circuit board due to an electric current which flows from the energy storage device 40. As described above, according to the energy storage apparatus 1, an adverse effect exerted on the circuit board by the energy storage device 40 can be suppressed.

By arranging the circuit board along the inner surface of the side wall of the outer case 10 (in this embodiment, disposed parallel to the inner surface), the circuit board is directed in a vertical direction. Accordingly, for example, even in the case where the energy storage apparatus 1 is used in a site such as a desert where dust is large, it is possible to suppress piling of the dust on the circuit board.

In the case of mounting the circuit board on the upper surface or the bottom surface of the outer case 10, it is necessary to ensure a space in which the circuit board is disposed in a height direction. On the other hand, in case of mounting the circuit board on the side surface of the outer case 10, the circuit board can be disposed by making use of a dead space on a side of the energy storage device 40. Accordingly, in the energy storage apparatus 1, the circuit board is fixed to the inner surface of the side wall of the outer case 10 and hence, it is possible to realize downsizing of the energy storage apparatus 1 by making use of a dead space on a side of the energy storage device 40.

In the energy storage apparatus 1, the end portion of the circuit board is fixed by the fixing portions 160, 220 formed on the inner surface of the side wall 120, 210 of the outer case 10. Accordingly, the circuit board can be fixed with certainty to the side wall without obstructing the arrangement of electronic parts in the inside of the circuit board.

In the energy storage apparatus 1, the movement of at least one of two circuit boards in a direction along the bottom wall 110 is restricted by the first restricting portions 150 formed on the inner surface of the bottom wall 110 of the outer case 10. That is, the circuit board can be positioned by the end portion of the circuit board on a bottom wall 110 side and hence, the circuit board can be easily fixed to the outer case 10.

The recessed portion is formed on each first restricting portion 150, and the circuit board is detachably inserted into the recessed portion. Accordingly, the first restricting portion 150 can be formed in a simple shape in the form of a recessed portion and hence, the first restricting portion 150 can be formed easily. Further, the circuit board can be easily mounted by merely inserting the circuit board into the recessed portion, and the circuit board can be also easily removed. Particularly, the circuit board can be easily mounted and removed in a state where the energy storage devices 40 are accommodated in the inside of the energy storage apparatus 1.

In the energy storage apparatus 1 according to the embodiment of the present invention, the bottom-surface-side arrangement member 20 is smaller than the outer case 10 and is disposed in an offset manner with respect to the outer case 10. Accordingly, the L-shaped space is formed between the bottom-surface-side arrangement member 20 and the outer case 10. In this manner, the space can be formed between the bottom-surface-side arrangement member 20 and at least two surfaces of the inner surfaces of the outer case 10 and hence, the space between the energy storage devices 40 and the outer case 10 can be increased. Accordingly, the energy storage devices 40 and other parts can be easily disposed in the outer case 10 thus enhancing operability in assembling the energy storage apparatus 1.

The measuring circuit board 81 and the main circuit board 82 are disposed in the L-shaped space and hence, the measuring circuit board 81 and the main circuit board 82 can be disposed away from the energy storage devices 40. Accordingly, it is possible to suppress the occurrence of a phenomenon that heat from the energy storage device 40 is transmitted to the circuit board and adversely affects the circuit board. Further, it is possible to suppress the occurrence of a phenomenon that noise occurs in a circuit disposed in the inside of the circuit board due to an electric current which flows from the energy storage device 40. In this manner, according to the energy storage apparatus 1, an adverse effect exerted on the circuit board by the energy storage device 40 can be suppressed.

The second restricting portions 180 disposed on the bottom wall surface of the outer case 10 restrict the movement of the bottom-surface-side arrangement member 20 which holds the energy storage devices 40 in a direction along the bottom wall surface of the outer case 10. Accordingly, even in the energy storage apparatus 1 where the L-shaped space is formed, the energy storage devices 40 can be held at predetermined positions in the outer case 10. With such a configuration, it is possible to suppress an adverse effect exerted on the energy storage apparatus 1 by the movement of the energy storage devices 40 toward the space between the energy storage devices 40 and the outer case 10 such as, for example, a mechanical load applied to the connecting portions with the energy storage devices 40 such as the bus bars 60 and the impingement of the energy storage devices 40 to other electric equipment such as the circuit board.

The second restricting portions 180 are convex portions formed in a projecting manner from the bottom wall surface of the outer case 10. Accordingly, the movement of the bottom-surface-side arrangement member 20 in a direction along the bottom wall surface can be restricted with the simple configuration.

The second restricting portions 180 which are mounted on the bottom wall surface of the outer case 10 are respectively fitted in the opening portions of the bottom-surface-side arrangement member 20 and hence, it is possible to effectively restrict the movement of the bottom-surface-side arrangement member 20 in a direction along the bottom wall surface of the outer case 10.

The fixing members 170 are connected with the second restricting portions 180 thus fixing the bottom-surface-side arrangement member 20. That is, the bottom-surface-side arrangement member 20 can be fixed by connecting the fixing members 170 to the second restricting portions 180 respectively from the inside of the energy storage apparatus 1. In other words, it is unnecessary to fix the bottom-surface-side arrangement member 20 to the outer case 10 by using the fixing member from the outside (the minus side in the Z axis direction) of the outer case 10. Accordingly, it is possible to enhance the operability in assembling the energy storage apparatus 1.

Although the energy storage apparatus according to the embodiment of the present invention has been described heretofore, the present invention is not limited to the above-mentioned embodiment. That is, it should be construed that the embodiment disclosed in this specification is only for an exemplifying purpose in all aspects and is not limited. The scope of the present invention is not designated by the above-mentioned description but is designated by Claims, and it is intended that all modifications which fall within the meaning and the scope equivalent to Claims are also included in the scope of the present invention. The configurations which are made by arbitrarily combining the respective constitutional elements which the above-mentioned embodiment includes are also included in the scope of the present invention.

For example, in the above-mentioned embodiment, the measuring circuit board 81 is fixed to the side wall 210 which is disposed such that the side wall 210 oppositely faces the long side surface 411 of the container 410 of the energy storage device 40. However, the side wall 140 of the outer case 10 is also disposed such that the side wall 140 oppositely faces the long side surface 411 and hence, the measuring circuit board 81 may be fixed to the side wall 140.

In the above-mentioned embodiment, the main circuit board 82 is fixed to the side wall 120 which is disposed such that the side wall 120 opposedly faces the short side surface 412 of the container 410 of the energy storage device 40. However, the side wall 130 of the outer case 10 is also disposed such that the side wall 130 opposedly faces the short side surface 412 and hence, the main circuit board 82 may be fixed to the side wall 130. Alternatively, the main circuit board 82 may be fixed to the upper wall portion 300 of the outer case 10 or to the bottom wall 110 of the outer case body 100. That is, it is sufficient that the main circuit board 82 be disposed such that the main circuit board 82 opposedly faces a position of the container 410 of the energy storage device 40 different from the long side surface 411.

Alternatively, the measuring circuit board 81 and the main circuit board 82 may be fixed to a wall surface of the outer case 10 other than the above-mentioned wall surfaces of the outer case 10. That is, the measuring circuit board 81 may be fixed to the inner surface of the side wall 120, the inner surface of the side wall 130, the inner surface of the side wall 140, the inner surface of the bottom wall 110, or the inner surface of the upper wall portion 300. Further, the main circuit board 82 may be fixed to the inner surface of the side wall 130, the inner surface of the side wall 140, the inner surface of the side wall 210, the inner surface of the bottom wall 110, or the inner surface of the upper wall portion 300. In other words, the measuring circuit board 81 and the main circuit board 82 may be disposed such that the measuring circuit board 81 and the main circuit board 82 opposedly face any surfaces of the container 410 of the energy storage device 40. That is, the walls on which the first restricting portions 150 and the fixing portions 160, 220 are formed are not particularly limited.

In the above-mentioned embodiment, the first restricting portions 150 are mounted on the bottom wall 110 of the outer case 10, and the fixing portions 160, 220 are mounted on the side walls 120, 210 respectively. However, the first restricting portions 150 and the fixing portions 160, 220 may be mounted on any walls provided that the measuring circuit board 81 and the main circuit board 82 can be mounted at desired positions.

In the above-mentioned embodiment, the first restricting protons 150 are disposed at positions where the first restricting portions 150 are brought into contact with the lower end portions of the measuring circuit board 81 and the main circuit board 82 and restrict the movement of the measuring circuit board 81 and the main circuit board 82, while the fixing portions 220, 160 are disposed at positions respectively corresponding to the upper end portions of the measuring circuit board 81 and the main circuit board 82. However, the positions of the first restricting portions 150 and the fixing portions 220, 160 are not particularly limited. That is, the first restricting portions 150 may be disposed at positions where the first restricting portions 150 restrict the movement of the measuring circuit board 81 and the main circuit board 82 by coming into contact with the upper end portions, the side end portions or center portions of the measuring circuit board 81 and the main circuit board 82 instead of coming into contact with the lower end portions of the measuring circuit board 81 and the main circuit board 82. Further, the fixing portions 220, 160 may be disposed at positions where the fixing portions 220, 160 fix the lower end portions, the side end portions or the center portions of the measuring circuit board 81 and the main circuit board 82 instead of being disposed at positions for fixing the upper end portions of the measuring circuit board 81 and the main circuit board 82.

In the above-mentioned embodiment, the first restricting portions 150 respectively include the recessed portion and restrict the movement of the measuring circuit board 81 and the main circuit board 82. However, the shape of the first restricting portion 150 is not limited to such a recessed portion, and may be formed as a projection or the like which is brought into contact with an end portion of the measuring circuit board 81 or the main circuit board 82. Alternatively, the bottom wall 110 may not have the first restricting portions 150.

In the above-mentioned embodiment, the measuring circuit board 81 and the main circuit board 82 are fixed to the inner wall surfaces of the outer case 10 respectively. However, these circuit boards may be fixed to the member other than the outer case 10 (for example, the bottom-surface-side arrangement member 20, the terminal-side arrangement member 50 or the like).

In the above-mentioned embodiment, the measuring circuit board 81 and the main circuit board 82 are formed of two circuit boards which are disposed in an L shape. However, the measuring circuit board 81 and the main circuit board 82 may be integrally formed with each other. For example, the measuring circuit board 81 and the main circuit board 82 may be formed of one circuit board which is formed in an L shape, or may be formed by bending one flexible circuit board into an L shape.

In the above-mentioned embodiment, the wiring circuit boards 70 are disposed above the terminal-side arrangement member 50. However, the wiring circuit boards 70 may be also fixed to the inner wall surface of the outer case 10 such as substantially at the same position as the measuring circuit board 81.

In the above-mentioned embodiment, the second restricting portion 180 is configured such that the opening portions 521 of the bottom-surface-side arrangement member 20 are fixed to the bottom wall 110 by using the fixing members 170 such as screws. However, as shown in FIG. 16, the configuration may be adopted where the opening portions 521 of the bottom-surface-side arrangement member 20 are not fixed to the bottom wall 110 by the fixing member 170.

Figure 16:
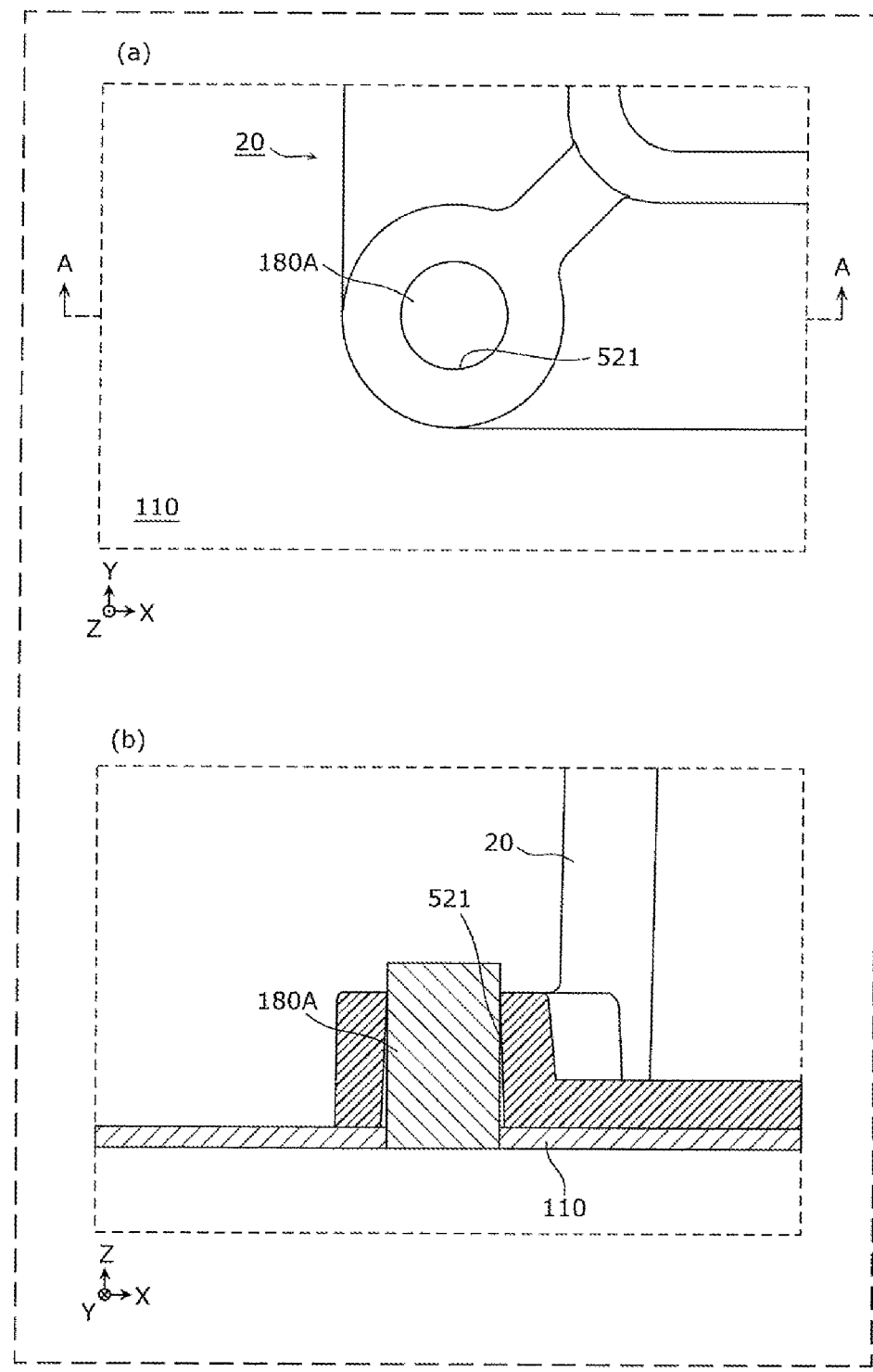
FIG. 16 is a view for describing one example of a relationship between a second restricting portion of a bottom wall and an opening portion of a bottom-surface-side arrangement member according to another embodiment of the present invention.

FIG. 16 is a view for describing one example of a relationship between a second restricting portion 180A formed on a bottom wall 110 and an opening portion 521 formed on a bottom-surface-side arrangement member 20 according to another embodiment of the present invention. To be more specific, (a) of FIG. 16 is a plan view of a region corresponding to (b) of FIG. 13 in an energy storage apparatus according to another embodiment. (b) of FIG. 16 is a cross-sectional view taken along line A-A in (a) of FIG. 16.

As shown in FIG. 16, the opening portion 521 of the bottom-surface-side arrangement member 20 may not be fixed to the second restricting portion 180A by a fixing member 170. That is, a female threaded portion may not be formed in the second restricting portion 180A. Even with the second restricting portion 180A having the above-mentioned configuration, for example, provided that such a configuration can restrict the movement of the bottom-surface-side arrangement member 20 in a direction away from the bottom wall 110 as shown in FIG. 15, the second restricting portion 180A can effectively restrict the movement of the bottom-surface-side arrangement member 20 in a direction along a bottom wall surface of an outer case.

In the above-mentioned embodiment and modification of the embodiment, the opening portion 521 of the bottom-surface-side arrangement member 20 is formed of a through hole whose inner edge portion is annularly continuously formed. However, as shown in FIG. 17, the opening portion of the bottom-surface-side arrangement member 20 may be an opening portion 521B which is formed into a partially cutout shape.

Figure 17:
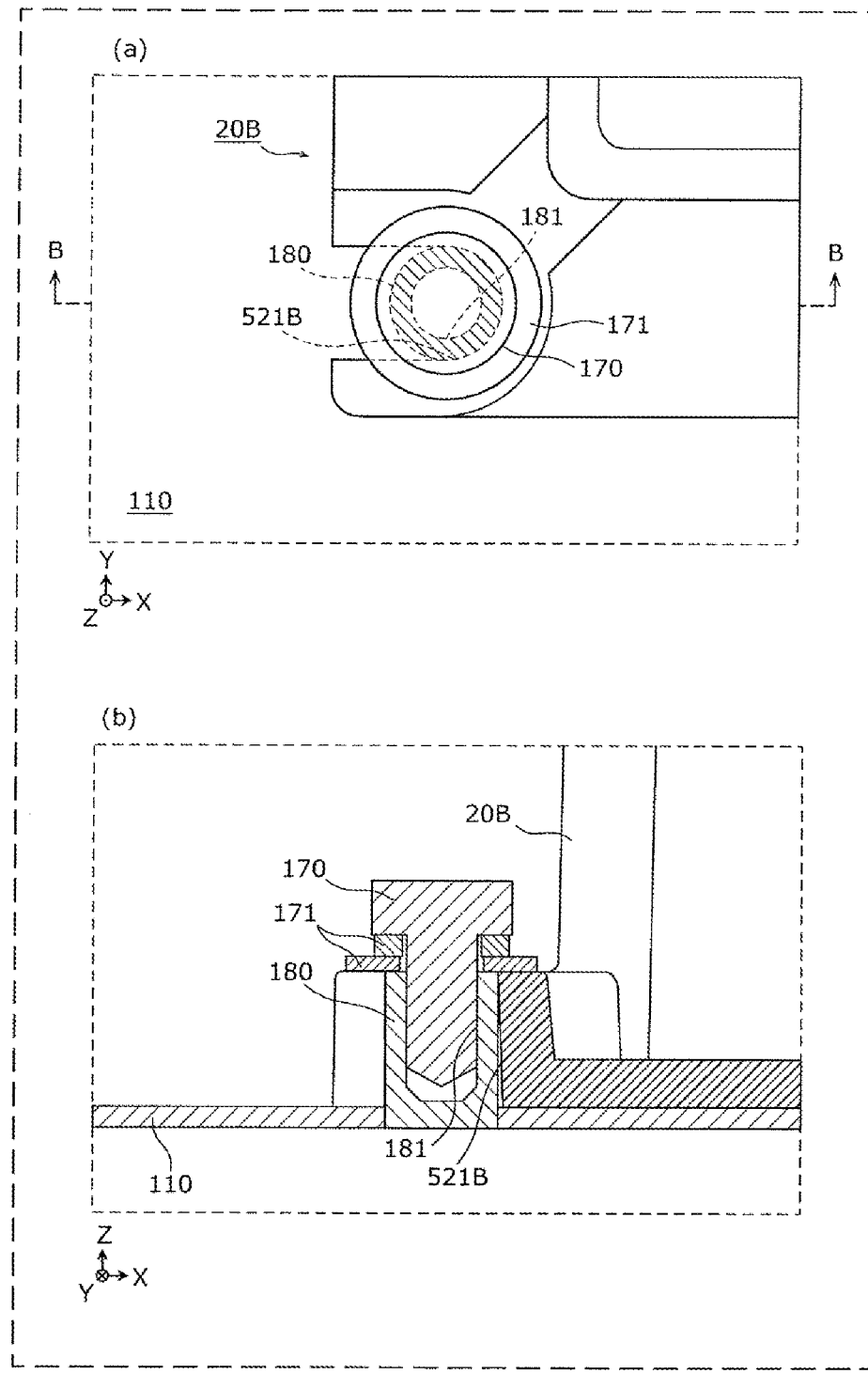
FIG. 17 is a view for describing another example of the relationship between the second restricting portion of the bottom wall and the opening portion of the bottom-surface-side arrangement member according to another embodiment of the present invention.

FIG. 17 is a view for describing another example of a relationship between a second restricting portion 180 formed on a bottom wall 110 and the opening portion 521B formed on a bottom-surface-side arrangement member 20B according to another embodiment of the present invention. To be more specific, (a) of FIG. 17 is a plan view of a region corresponding to (b) of FIG. 13 in an energy storage apparatus according to another embodiment. (b) of FIG. 17 is a cross-sectional view taken along line B-B in (a) of FIG. 17.

As shown in FIG. 17, the opening portion 521B formed on the bottom-surface-side arrangement member 20B may be an opening portion having a cutout shape whose minus side in the X axis direction is opened. A side where the opened portion is formed is not limited to the minus side in the X axis direction.

Figure 18:
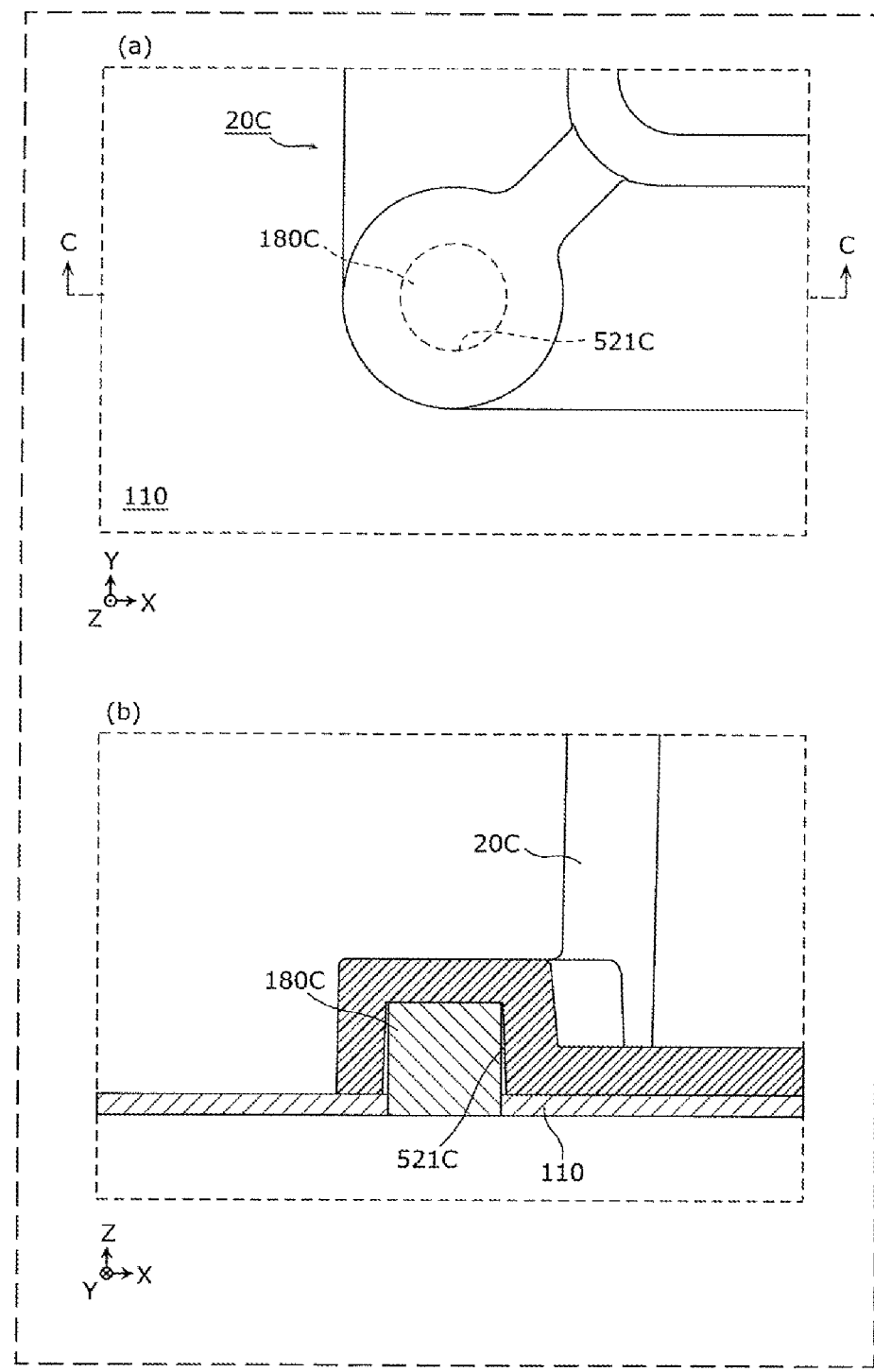
FIG. 18 is a view for describing another example of the relationship between the second restricting portion of the bottom wall and the opening portion of the bottom-surface-side arrangement member according to another embodiment of the present invention.

As shown in FIG. 18, the opening portion 521 may be an opening portion 521C which does not penetrate a bottom-surface-side arrangement member 20C in the Z axis direction.

FIG. 18 is a view for describing another example of a relationship between a second restricting portion 180C formed on a bottom wall 110 and the opening portion 521C formed on the bottom-surface-side arrangement member 20C according to another embodiment of the present invention. To be more specific, (a) of FIG. 18 is a plan view of a region corresponding to (b) of FIG. 13 in an energy storage apparatus according to another embodiment. (b) of FIG. 18 is a cross-sectional view taken along line C-C in (a) of FIG. 18.

As shown in FIG. 18, the opening portion 521C may be a recessed portion which is engaged with the second restricting portion 180C formed on the bottom wall 110 by fitting engagement. Such a recessed portion also has a shape which allows the fitting engagement with the second restricting portion 180C and hence, the second restricting portion 180C can restrict the movement of the bottom-surface-side arrangement member 20C in all directions along a bottom wall surface of an outer case.

Figure 19:
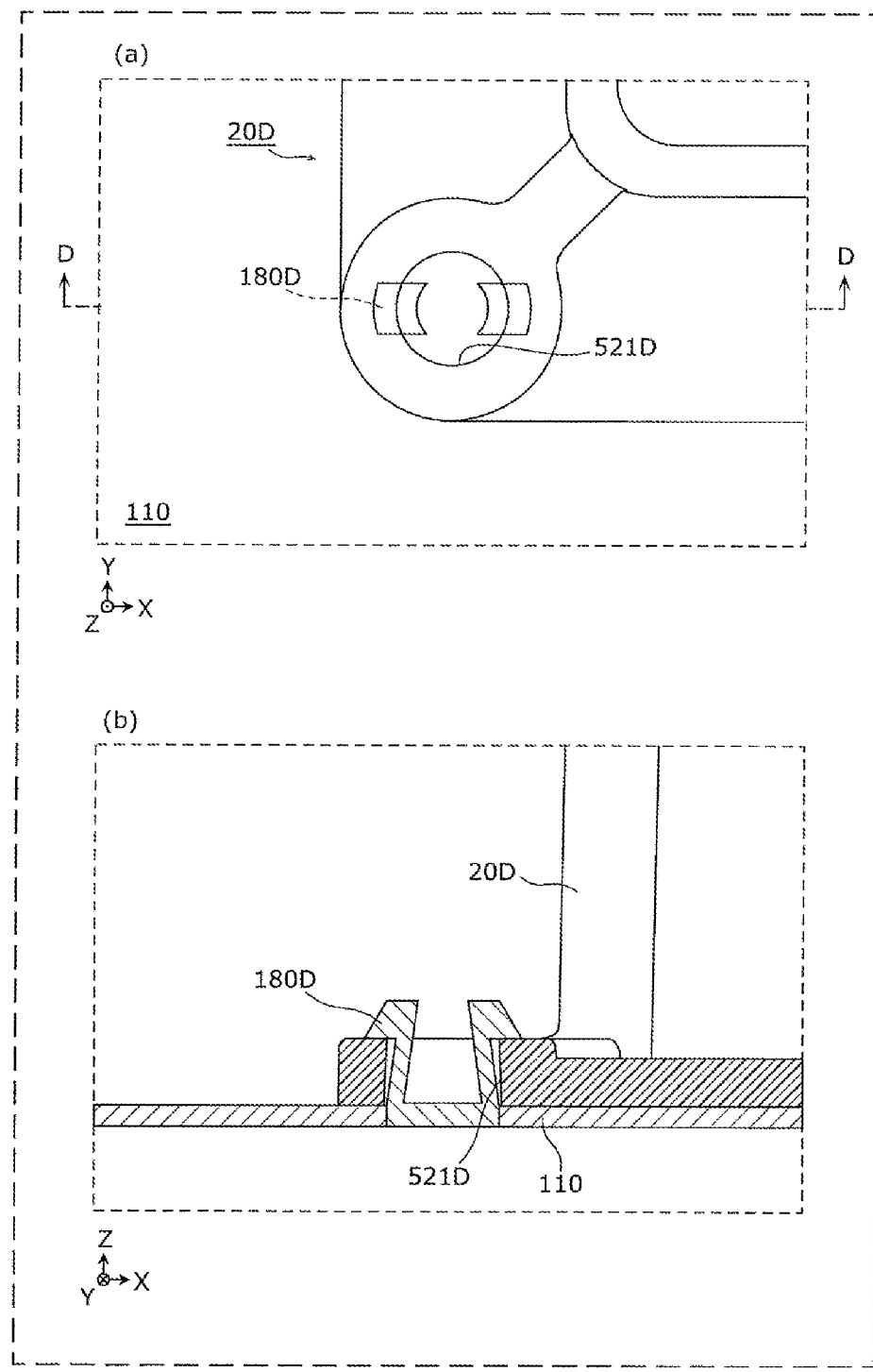
FIG. 19 is a view for describing another example of the relationship between the second restricting portion of the bottom wall and the opening portion of the bottom-surface-side arrangement member according to another embodiment of the present invention.

As shown in FIG. 19, the configuration may be adopted where an opening portion 521D of a bottom-surface-side arrangement member 20D is fixed by a second restricting portion 180D per se.

FIG. 19 is a view for describing another example of a relationship between the second restricting portion 180D formed on a bottom wall 110 and the opening portion 521D formed on the bottom-surface-side arrangement member 20D according to another embodiment of the present invention. To be more specific, (a) of FIG. 19 is a plan view of a region corresponding to (b) of FIG. 13 in an energy storage apparatus according to another embodiment. (b) of FIG. 19 is a cross-sectional view taken along line D-D in (a) of FIG. 19.

As shown in FIG. 19, the second restricting portion 180D has a shape where distal ends of the second restricting portion 180D on the plus side in the Z axis direction are engageable with the opening portion 521D. With such a configuration, the second restricting portion 180D restricts the movement of the bottom-surface-side arrangement member 20D in a direction along a bottom wall surface of an outer case and, at the same time, can restrict the movement of the bottom-surface-side arrangement member 20D also in the Z axis direction.

In the above-mentioned embodiment and the modifications of the embodiment, the second restricting portion 180, 180A, 180C and 180D is configured to be fitted in the opening portion 521, 521B, 521C and 521D of the bottom-surface-side arrangement member 20, 20B to 20D. However, as shown in FIG. 20, the configurations may be adopted where a second restricting portion 180E is engaged with an opening portion 521E of a bottom-surface-side arrangement member 20E without being fitted in the opening portion 521E.

Figure 20:
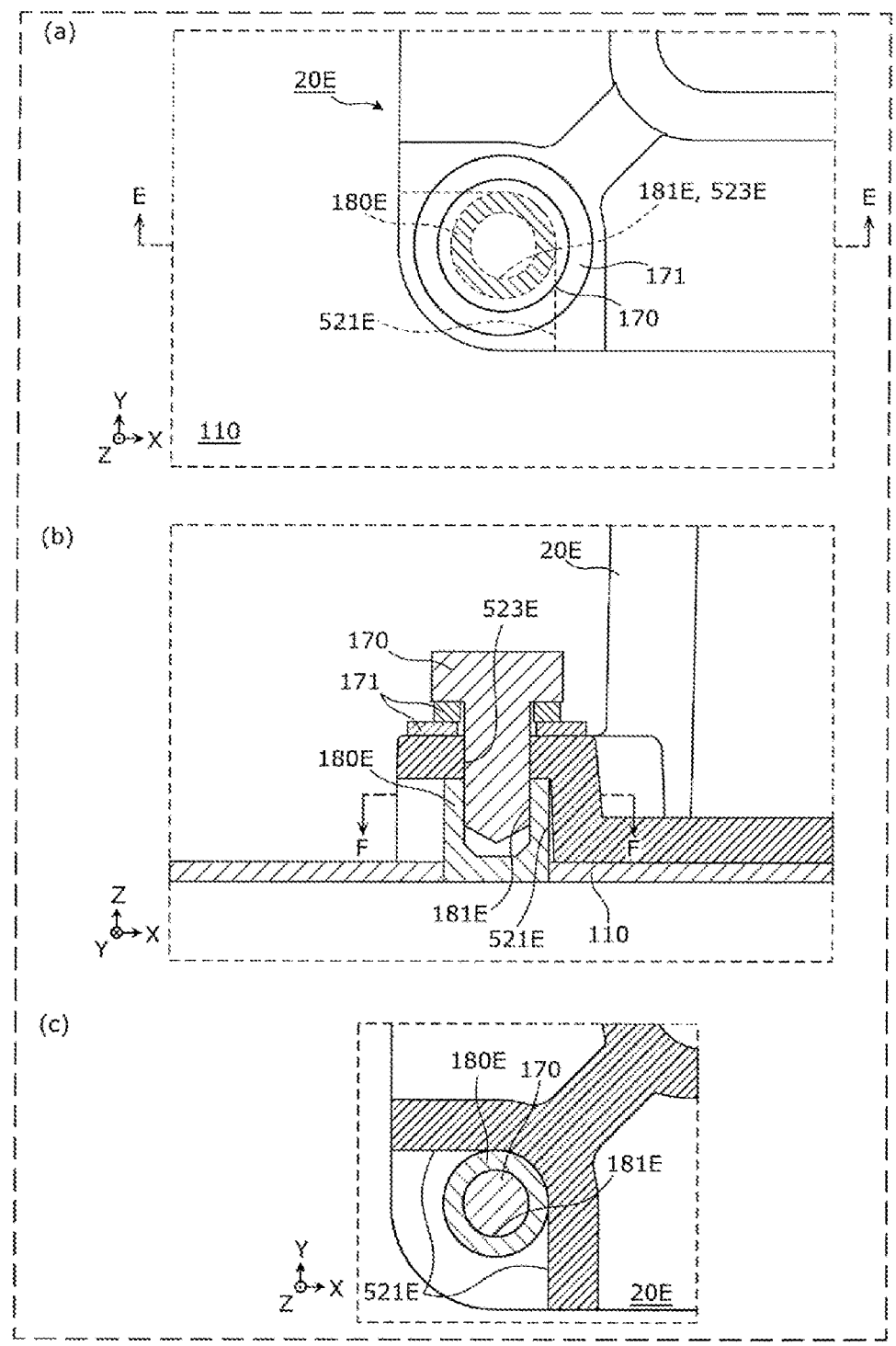
FIG. 20 is a view for describing another example of the relationship between the second restricting portion of the bottom wall and the opening portion of the bottom-surface-side arrangement member according to another embodiment of the present invention.

FIG. 20 is a view for describing another example of a relationship between the second restricting portion 180E formed on a bottom wall 110 and the opening portion 521E formed on the bottom-surface-side arrangement member 20E in an energy storage apparatus according to another embodiment of the present invention. To be more specific, (a) of FIG. 20 is a plan view of a region corresponding to (b) of FIG. 13 in the energy storage apparatus according to another embodiment. (b) of FIG. 20 is a cross-sectional view taken along line E-E in (a) of FIG. 20. (c) of FIG. 20 is a cross-sectional view taken along line F-F in (b) of FIG. 20.

As shown in FIG. 20, although the second restricting portion 180E is not fitted in the opening portion 521E formed on the bottom-surface-side arrangement member 20E, the opening portion 521E is engaged with a portion of an outer edge of the second restricting portion 180E. Further, the bottom-surface-side arrangement member 20E is fixed to the second restricting portion 180E by making a fixing member 170 pass through an opening portion 523E additionally provided different from the opening portion 521E of the bottom-surface-side arrangement member 20E. Accordingly, the second restricting portion 180E can restrict the movement of the bottom-surface-side arrangement member 20E in a direction along a bottom wall surface of an outer case by way of the fixing member 170.

In FIG. 20, the fixing member 170 may not be mounted. That is, a female threaded portion 181E may not be formed in the second restricting portion 180E, and the opening portion 523E may not be formed in the bottom-surface-side arrangement member 20E. In this case, it is preferable that the bottom-surface-side arrangement member 20E be configured such that the opening portion 521E is formed on four corners of the bottom-surface-side arrangement member 20E respectively as viewed in a top plan view, and four opening portions 521E are respectively engaged with the second restricting portions 180E. In this case, four second restricting portions 180E are engaged with the opening portions 521E which respectively correspond to the second restricting portions 180E in different directions respectively. Accordingly, four second restricting portions 180E can restrict the movement of the bottom-surface-side arrangement member 20E in all directions along the bottom wall surface of the outer case.

In the above-mentioned embodiment and the modifications of the embodiment, the second restricting portions 180, 180A, 180C, 180D or 180E mounted on the bottom wall 110 of the outer case body 100 restrict the movement of the bottom-surface-side arrangement member 20, 20B, 20C, 20D and 20E in a direction along the bottom wall surface. However, the present invention is not limited to such a configuration. For example, the side wall 130 provided to the outer case body 100 may be configured to restrict the movement of the bottom-surface-side arrangement member 20 in a direction along the bottom wall surface by bringing the projecting portions 522 of the bottom-surface-side arrangement member 20 into contact with the side wall 130 in a direction along the bottom wall surface.

In the above-mentioned embodiment and the modifications of the embodiment, the bottom-surface-side arrangement member 20 is placed on the bottom wall 110 of the outer case body 100, and the movement of the bottom-surface-side arrangement member 20 in a direction along the bottom wall surface is restricted by the second restricting portions 180, 180A, 180C, 180D or 180E mounted on the bottom wall 110. However, the present invention is not limited to such a configuration. The bottom-surface-side arrangement member is not limited to be placed on the bottom wall surface, and may be placed on any wall surface provided that the wall surface is a wall surface of the outer case body 100. It is sufficient that the second restricting portion be mounted on a wall surface on which the bottom-surface-side arrangement member is placed and restrict the movement of the bottom-surface-side arrangement member in a direction along the wall surface.

In the above-mentioned embodiment and the modifications of the embodiment, as the holding member for holding the energy storage devices 40, the bottom-surface-side arrangement member 20, 20B, 20C, 20D, 20E which is disposed on a bottom surface side of the energy storage device 40 is adopted. The present invention is not limited to such a configuration. The terminal-side arrangement member 50 disposed on a terminal side of the energy storage device 40 may be adopted as the holding member. That is, in this case, the movement of the terminal-side arrangement member 50 in a direction along the inner surface of the upper wall portion 300 is restricted by second restricting portions mounted on the upper wall portion 300. Similarly, as the holding member, a member which holds a side surface of an energy storage device (a short side surface or a long side surface) may be adopted.

In the above-mentioned embodiment and the modifications of the embodiment, the second restricting portions 180, 180A, 180C, 180D, 180E are convex portions projecting from the bottom wall 110 toward the inside of the outer case 10. However, the present invention is not limited to such a configuration. The second restricting portions may be opening portions or recessed portions formed in or on the bottom wall, for example. In this case, convex portions which are engaged with opening portions or recessed portions formed in or on the bottom wall by fitting engagement may be formed on the bottom-surface-side arrangement member.

In the above-mentioned embodiment and the modifications of the embodiment, the bottom-surface-side arrangement member 20, 20B, 20C, 20D, 20E is configured such that the opening portions 521, 521B, 521C, 521D, 521E or 523E are engaged with the second restricting portions 180, 180A, 180C, 180D or 180E so that the movement of the bottom-surface-side arrangement member 20, 20B, 20C, 20D, 20E in a direction along the bottom wall surface is restricted. However, the present invention is not limited to such a configuration. The bottom-surface-side arrangement member may be configured such that the movement of the bottom-surface-side arrangement member is restricted by simply bringing a portion of the bottom-surface-side arrangement member into contact with the second restricting portion. That is, for example, the bottom-surface-side arrangement member may be configured to include a contact portion which is brought into contact with a convex portion as the second restricting portion formed on a bottom wall of an outer case in a direction along a bottom wall surface on an outer edge portion of the bottom-surface-side arrangement member.

In the above-mentioned embodiment and the modifications of the embodiment, each of the energy storage devices 40 accommodated in the energy storage apparatus 1 is a battery including a container having a metal-made rectangular shape (box-shaped). However, the energy storage device 40 may be a battery including a container having a shape other than a box shape such as a circular cylindrical shape or an elongated circular cylindrical shape. In this case, for example, a surface of a cylindrical portion (curved surface portion) of the container having the maximum projection area (or surface area) is assumed as a long side surface, and surfaces other than the long side surface (surfaces corresponding to a lid portion, a bottom portion and the like) are assumed as surfaces (for example, short side surfaces) different from the long side surface. Alternatively, when the energy storage device 40 has an elongated circular cylindrical shape, a flat surface of the cylindrical portion of the container is assumed as a long side surface, and a curved surface of the cylindrical portion is assumed as a surface (a short side surface) different from the long side surface.

Figure 21:
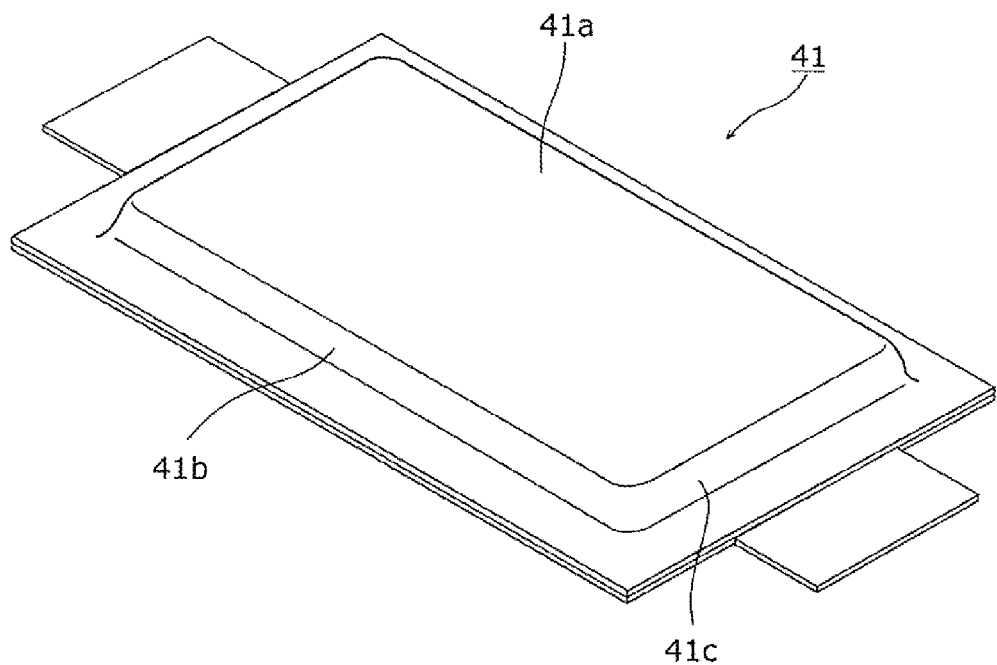
FIG. 21 is a perspective view showing the configuration of a laminate-type energy storage device according to another embodiment of the present invention.

Alternatively, as shown in FIG. 21, an energy storage device accommodated in the energy storage apparatus 1 may be a laminate-type battery (pouch cell) where a container is formed using a laminated film. FIG. 21 is a perspective view showing a configuration of a laminate-type energy storage device 41 according to another embodiment of the present invention. Also in this case, a surface of a container having the maximum projection area (or surface area) is assumed as a long side surface, and surfaces other than the long side surface are assumed as surfaces (for example, short side surfaces) different from the long side surface. That is, the flat surface 41a in FIG. 21 is assumed as the long side surface, and a side surface 41b, a side surface 41c and the like are assumed as surfaces (short side surfaces) different from the long side surface, for example.

Here, any number of energy storage devices 41 may be disposed in the inside of the energy storage apparatus 1, positions and directions of the energy storage devices 41 in the inside of the energy storage apparatus 1 are not particularly limited provided that the configuration described in the above-mentioned embodiment is satisfied. Further, the energy storage device 41 may have a shape different from the shape shown in FIG. 21 such as a circular columnar shape or an elongated circular columnar shape. Also in this case, similarly as described above, a long side surface and a surface (a short side surface) different from the long side surface are defined.

The present invention is applicable to an energy storage apparatus or the like including energy storage devices and an outer case.

DESCRIPTION OF REFERENCE SIGNS

1: energy storage apparatus
10: outer case
20, 20B, 20C, 20D, 20E: bottom-surface-side arrangement member (holding member)
40, 41: energy storage device
50: terminal-side arrangement member
60: bus bar
61: first wiring
62: second wiring
63: third wiring
64: fourth wiring
70: wiring circuit board
71: detection part
72: wiring
81: measuring circuit board
81a, 82a: fixing opening portion 81b, 81c: connector
82: main circuit board
83: circuit-board to circuit-board connector
100: outer case body
110: bottom wall
120, 130, 140, 210: side wall
150, 151, 152: first restricting portion
150a: base portion
150b, 150c: projecting portion
150d: support portion
160, 220: fixing portion
160a, 181, 181E: female threaded portion
170: fixing member
171: washer
180, 180A, 180C, 180D, 180E: second restricting portion
200: front wall portion
230: external connection terminal
250: connector-use opening portion
300: upper wall portion
410: container
411: long side surface
412: short side surface
420: container lid portion
430: positive electrode terminal
440: negative electrode terminal
510: holding portion
511: recessed portion
520: portion to be mounted
521, 521B, 521C, 521D, 521E, 523E: opening portion
522: projecting portion

The invention claimed is:

1. An energy storage apparatus comprising:
an energy storage device;
a holding member which holds the energy storage device;
an outer case;
a first circuit board which is connected to the energy storage device and through which a first current flows; and
a second circuit board through which a second current larger than the first current flows,
wherein:
the second circuit board is disposed such that the second circuit board opposedly faces a position which differs from a long side surface of a container of the energy storage device,
the outer case includes a second restricting portion which restricts a movement of the holding member in a direction along a wall surface of the outer case on the wall surface of the outer case,
the holding member is smaller than the outer case and is disposed in an offset manner with respect to the outer case,
an L-shaped space is formed between the holding member and the outer case, and
the second restricting portion is a convex portion projecting from the wall surface.

2. The energy storage apparatus according to claim 1, wherein the first circuit board is disposed such that the first circuit board opposedly faces the long side surface of the container of the energy storage device.

3. The energy storage apparatus according to claim 1, wherein the second circuit board is disposed such that the second circuit board opposedly faces a short side surface of the container of the energy storage device.

4. The energy storage apparatus according to claim 1, wherein:
the first circuit board is disposed along an inner surface of a first wall of the outer case, and
the second circuit board is disposed along an inner surface of a second wall disposed adjacently to the first wall of the outer case.

5. The energy storage apparatus according to claim 1, wherein at least one of the first circuit board and the second circuit board is fixed to an inner wall surface of the outer case.

6. The energy storage apparatus according to claim 5, wherein the outer case includes a fixing portion for fixing an end portion of at least one circuit board out of the first circuit board and the second circuit board on an inner surface of a side wall of the outer case.

7. The energy storage apparatus according to claim 1, wherein the outer case includes, on an inner surface of a bottom wall thereof, a first restricting portion which restricts a movement of at least one circuit board out of the first circuit board and the second circuit board in a direction along the bottom wall.

8. The energy storage apparatus according to claim 7, wherein:
the first restricting portion includes a recessed portion into which at least one circuit board out of the first circuit board, and
the second circuit board is detachably inserted in a direction toward the bottom wall.

9. The energy storage apparatus according to claim 1, wherein:
the energy storage apparatus further includes a circuit-board to circuit-board connector which connects the first circuit board and the second circuit board to each other, and
the first circuit board and the second circuit board are fixed to the inner surfaces of two side walls of the outer case disposed adjacently to each other respectively.

10. The energy storage apparatus according to claim 1, wherein the second restricting portion restricts the movement of the holding member by engaging with a portion of the holding member.

11. The energy storage apparatus according to claim 1, wherein the holding member has an opening portion into which the convex portion is fitted.

12. The energy storage apparatus according to claim 1, wherein the energy storage apparatus further includes a fixing member which is connected to the convex portion and fixes the holding member.

13. An energy storage apparatus comprising:
an energy storage device;
an outer case comprising a second restricting portion and a wall surface;
a first circuit board which is connected to the energy storage device and through which a first current flows;
a second circuit board through which a second current larger than the first current flows; and
a holding member which holds the energy storage device,
wherein:
the second circuit board is disposed such that the second circuit board opposedly faces a position which differs from a long side surface of a container of the energy storage device;
the second restricting portion restricts a movement of the holding member in a direction along the wall surface of the outer case;
the holding member is smaller than the outer case and is disposed in an offset manner with respect to the outer case;

an L-shaped space is formed between the holding member and the outer case; and the second restricting portion restricts the movement of the holding member by engaging with a portion of the holding member.

14. The energy storage apparatus according to claim 13, wherein at least one of:

the first circuit board is disposed such that the first circuit board opposedly faces the long side surface of the container of the energy storage device; or the second circuit board is disposed such that the second circuit board opposedly faces a short side surface of the container of the energy storage device.

15. The energy storage apparatus according to claim 13, wherein:

the first circuit board is disposed along an inner surface of a first wall of the outer case, and the second circuit board is disposed along an inner surface of a second wall disposed adjacently to the first wall of the outer case.

16. The energy storage apparatus according to claim 13, wherein:

at least one of the first circuit board and the second circuit board is fixed to an inner wall surface of the outer case; and the outer case includes a fixing portion for fixing an end portion of at least one circuit board out of the first circuit board and the second circuit board on an inner surface of a side wall of the outer case.

17. The energy storage apparatus according to claim 1, wherein:

the outer case includes, on an inner surface of a bottom wall thereof, a first restricting portion which restricts a movement of at least one circuit board out of the first circuit board and the second circuit board in a direction along the bottom wall;

the first restricting portion includes a recessed portion into which at least one circuit board out of the first circuit board, and the second circuit board is detachably inserted in a direction toward the bottom wall.

18. An energy storage apparatus comprising:

an energy storage device including a container;

an outer case;

a first circuit board which is connected to the energy storage device and through which a first current flows; and a second circuit board through which a second current larger than the first current flows, wherein:

the container comprises:

a lid portion on which a terminal is disposed;

a bottom portion opposed to the lid portion;

a short side surface; and a long side surface;

the short side surface and the long side surface connect the bottom portion; and the second circuit board is disposed such that the second circuit board opposedly faces a position which differs from the long side surface of the container of the energy storage device.

19. An energy storage apparatus comprising:

an energy storage device;

an outer case;

a first circuit board which is connected to the energy storage device and through which a first current flows; and a second circuit board through which a second current larger than the first current flows, wherein:

the second circuit board is disposed such that the second circuit board opposedly faces a position which differs from a long side surface of a container of the energy storage device, the outer case includes, on an inner surface of a bottom wall thereof, a first restricting portion which restricts a movement of at least one circuit board out of the first circuit board and the second circuit board in a direction along the bottom wall, the first restricting portion includes a recessed portion into which at least one circuit board out of the first circuit board, and the second circuit board is detachably inserted in a direction toward the bottom wall.

* * * * *